US008855442B2

(12) United States Patent
Owechko

(10) Patent No.: US 8,855,442 B2
(45) Date of Patent: Oct. 7, 2014

(54) IMAGE REGISTRATION OF MULTIMODAL DATA USING 3D-GEOARCS

(76) Inventor: Yuri Owechko, Newbury Park, CA (US)

( * ) Notice: Subject to any disclaimer, the term of this patent is extended or adjusted under 35 U.S.C. 154(b) by 249 days.

(21) Appl. No.: 13/459,643

(22) Filed: Apr. 30, 2012

(65) Prior Publication Data

US 2013/0287290 A1    Oct. 31, 2013

(51) Int. Cl.
| | | |
|---|---|---|
| G06K 9/32 | (2006.01) | |
| G06K 9/00 | (2006.01) | |
| G06K 9/46 | (2006.01) | |
| G06K 9/66 | (2006.01) | |
| G06K 9/36 | (2006.01) | |
| G06T 15/00 | (2011.01) | |
| G06T 17/00 | (2006.01) | |

(52) U.S. Cl.
USPC ........... 382/294; 382/154; 382/190; 382/284; 382/285; 345/419; 345/420

(58) Field of Classification Search
None
See application file for complete search history.

(56) References Cited

U.S. PATENT DOCUMENTS

| | | | |
|---|---|---|---|
| 6,219,444 B1 * | 4/2001 | Shashua et al. ............... | 382/154 |
| 6,661,914 B2 * | 12/2003 | Dufour .......................... | 382/154 |
| 7,580,591 B2 | 8/2009 | Oldroyd | |
| 2001/0036302 A1 | 11/2001 | Miller | |
| 2009/0141966 A1 * | 6/2009 | Chen et al. ..................... | 382/154 |
| 2009/0283626 A1 | 11/2009 | Lutke et al. | |
| 2009/0295791 A1 * | 12/2009 | Aguera y Arcas et al. ... | 345/419 |
| 2009/0315978 A1 * | 12/2009 | Wurmlin et al. ................ | 348/43 |
| 2012/0019522 A1 * | 1/2012 | Lawrence et al. ............. | 345/419 |

OTHER PUBLICATIONS

David Crandall, Lars Backstrom, Daniel Huttenlocher and Jon Kleinber, "Mapping the World's Photos," World Wide Web Conference Committee, Apr. 2009: 761-770, Madrid, Spain.
James Hays and Alexei A. Efros, "IM2GPS: estimating geographic information from a single image," IEEE Conf. on Computer Vision and Pattern Recognition (CVPR), 2008, 1-8.
Noah Snavely, Steven M. Seitz and Richard Szeliski, "Photo Tourism: Exploring Photo Collections in 3D," ACM Transaction on Graphics (SIGGRAPH Proceedings), 25(3), 2006, 835-846. 4.
Evangelos Kalogerakis, Olga Vesselova, James Hays, Alexei A. Efros and Aaron Hertzmann, "Image Sequence Geolocation with Human Travel Priors," IEEE International Conference on Computer Vision (2009).

(Continued)

*Primary Examiner* — Matthew Bella
*Assistant Examiner* — Jose M Torres
(74) *Attorney, Agent, or Firm* — Kunzler Law Group, PC; Kevin Pumm

(57) ABSTRACT

An accurate, flexible and scalable technique for multi-modal image registration is described, a technique that does not need to rely on direct feature matching and does not need to rely on precise geometric models. The methods and/or systems described in this disclosure enable the registration (fusion) of multi-modal images of a scene with a three dimensional (3D) representation of the same scene using, among other information, viewpoint data from a sensor that generated a target image, as well as 3D-GeoArcs. The registration techniques of the present disclosure may be comprised of three main steps, as shown in FIG. 1. The first main step includes forming a 3D reference model of a scene. The second main step includes estimating the 3D geospatial viewpoint of a sensor that generated a target image using 3D-GeoArcs. The third main step includes projecting the target image's data into a composite 3D scene representation.

18 Claims, 15 Drawing Sheets

(56) References Cited

OTHER PUBLICATIONS

Marco Cristani, Alessandro Perina, Uumberto Castellani and Vittorio Murino "Geo-located image analysis using latent representations," IEEE Computer Vision and Pattern Recognition (CVPR) 2008.

Jerry Zhang, Aaron Hallquist, Eric Liang, and Avideh Zakhor, "Location-based Image Retrieval for Urban Environments," ICIP 2011.

Grant Schindler, Matthew Brown and Richard Szeliski, "City-Scale Location Recognition," IEEE Computer Vision and Pattern Recognition, 2007.

Yunpeng Li, Noah Snavely and Daniel P. Huttenlocher, "Location recognition using prioritized feature matching," ECCV 2010.

Keith Yu Kit Leung, Christopher M. Clark and Jan P. Huissoon, "Location in Urban Environments by Matching Ground Level Video images With an Aerial Image," ICRA 2008.

Grant Schindler, Panchapagesan Krishnamurthy, Roberto Lublinderman, Yanxi Liu and Frank Dellaer, "Detecting and Matching Repeated Patterns for Automatic Geo-tagging in Urban Environments," CVPR 2008.

Wei Zhang and Jana Kosecka, "Image Based Localization in Urban Environments," International Symposium on 3D Data Processing, Visualization and Transmission, 3DPVT 2006.

Duncan Robertson and Roberto Cipolla, "An Image-Based System for Urban Navigation," in British Machine Vision Conference (2004).

William B. Thompson, Carolyn M. Valiquette, Bonnie H. Bennett, and Karen T. Sutherland, "Geometric reasoning under uncertainty for map-based localization," Spatial Cognition and Computation 1: 291-0321, Kluwer Academic Publishers, 1999.

William B. Thompson, Bonnie H. Bennett, and Karen T. Sutherland, "Geometric reasoning for Map-based Localization," University of Utah, Dept of Computer Science Tech. Report UUCS-96-005, pp. 1-23, May 29, 1996.

* cited by examiner

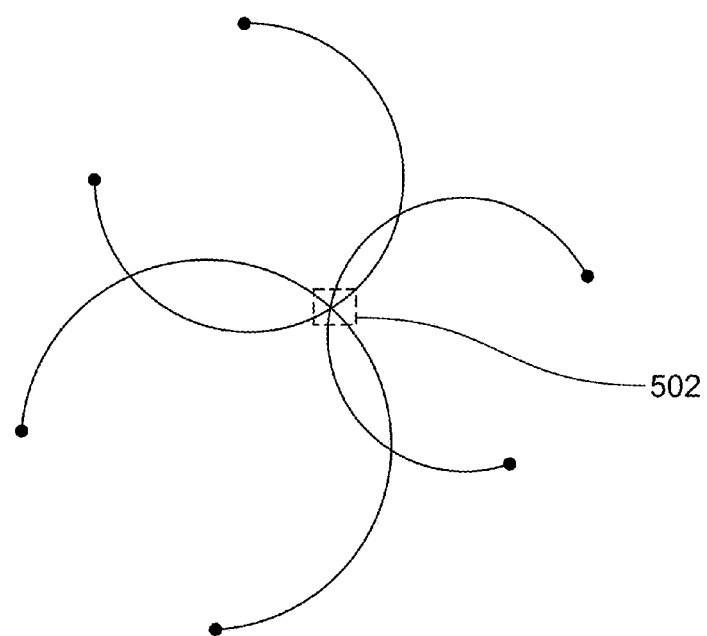
FIG. 5A
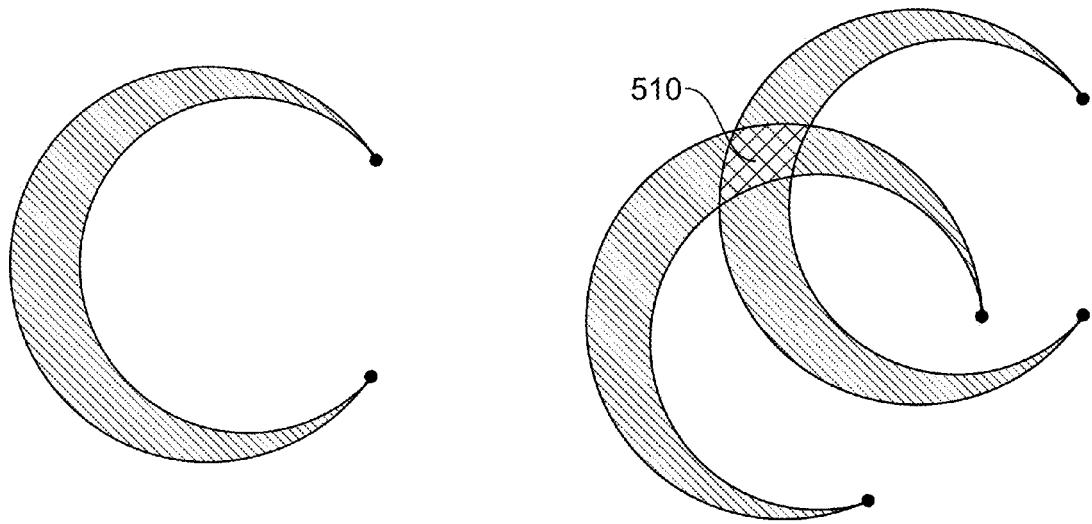
FIG. 5B
FIG. 5C

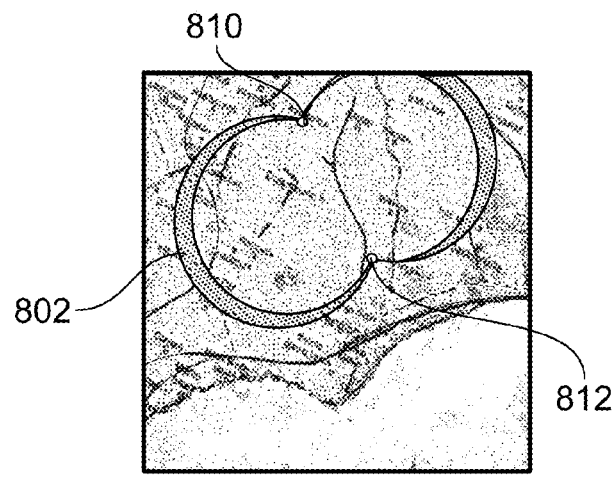
2 Features   FIG. 8A
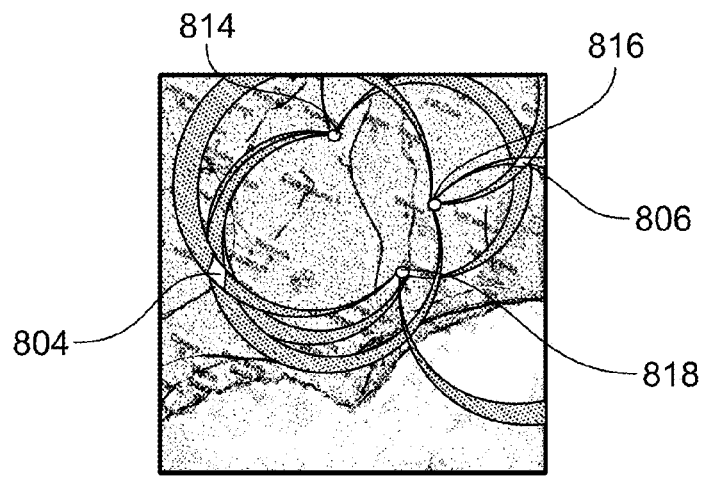
3 Features   FIG. 8B
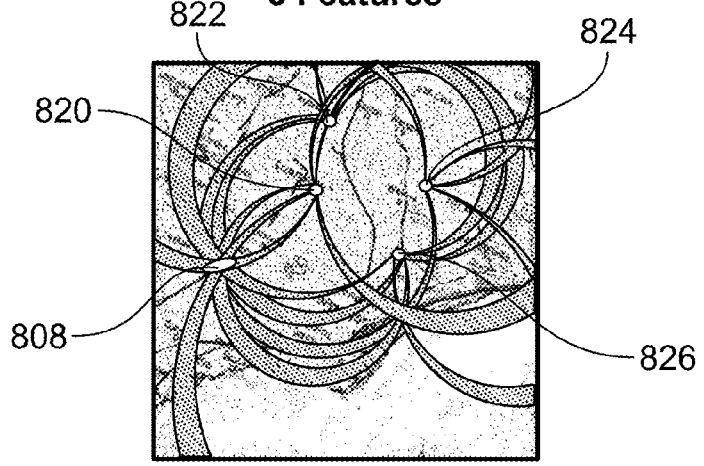
4 Features   FIG. 8C

IMAGE REGISTRATION OF MULTIMODAL DATA USING 3D-GEOARCS

CROSS-REFERENCE TO RELATED APPLICATIONS

None.

FIELD

The present disclosure relates to image registration systems and methods, and more particularly to image registration techniques that combine one or more multi-modal images of a scene with a 3D representation of the same scene using 3D-GeoArcs.

BACKGROUND

Image registration is the process of combining one or more sets of data to form a single data representation. Data sets may be multiple photographs, data from different sensors, data from different times, or data stored in different formats. Image registration techniques may involve combining two or more images, or selected points from the images, to produce a composite image containing data from each of the original images. Some image registration techniques may project details from one data set (referred to as the target) onto a second data set (referred to as the reference). Some image registration techniques may compare or transform a target image to align with one or more stored reference images. These image registration techniques may use algorithms to relate points between images so that related points or structures in the images are correlated in the resulting composite image.

Some methods of image registration search for detailed correspondences between particular features in the images such as points, lines and contours that appear similar. These appearance-based methods use discovered correspondences to transform or map a target image to one or more reference images. Such techniques may involve input from individual with expertise in the type of object, scene or structure represented in the images. The expert may identify a set of landmark features in the images that the registration technique should attempt to correlate. For example, an image registration method may compare two MRI images of different axial slices of a human head, and a physician may identify points (and/or contours surrounding these points) that corresponding to the cerebellum (a landmark) in the two images. The image registration algorithm may then map the target image to the reference image by relying on a known relationship between landmarks. Thus, by matching visible landmarks in the target image with previously identified landmarks in the reference image, the registration technique can draw conclusions about how the target image aligns with the reference image.

Other methods of image registration compare detailed volume-based (or 3D geometric) imagery in images using correlation metrics. Some of these geometry-based methods may then measure a distance that represents the disparity between a target image and a reference image based on how closely the volume-based features align. Registration of the two images may utilize an optimization equation that aids in finding a mapping that reduces this distance measurement. These methods may register entire images or sub-images, and if sub-images are registered, the sub-images may be treated as corresponding feature points.

Some other methods of image registration have used geospatial information to provide a reference source of structure or features. Geospacial information (or geolocation) refers generally to the identification of the real-world geographic location of an object. Geolocation may refer to the practice of assessing the location, or to the actual assessed location. Geospatial information may indicate ties between features in photographs and the actual geographical location such features or structures. For example, some current place recognition algorithms use GPS-tagged, crowd-sourced image collections from online repositories coupled with direct feature matching techniques and multi-view geometry. A target image may be taken of a street corner or a monument and then the place recognition algorithm attempts to find the most similar feature in a reference database by scanning a large number of saved reference images. These place recognition algorithms require large-scale image databases to enable such geolocation.

SUMMARY

One or more embodiments of the present disclosure describe methods, systems, techniques and/or solutions that enable the registration (fusion) of multi-modal images of a scene with a three dimensional (3D) representation of the same scene using, among other information, viewpoint data from a sensor that generated a target image, as well as 3D-GeoArcs.

In one advantageous embodiment, a method for image registration may be executed (for example, at least in part in a data processing system such a computer), wherein the method comprises the following steps. The first step of the method may include establishing a three-dimensional reference model of a scene. The next step of the method may include acquiring a target image of the scene, the target image perhaps being captured with a sensor. The next step of the method may include determining the viewpoint of the sensor that captured the target image using one or more three-dimensional geoarcs (also referred to as GeoArcs), wherein the viewpoint of the sensor may be determined relative to the three-dimensional reference model. The next step of the method may include generating a composite three-dimensional representation of the scene by associating data from the target image with data from the three-dimensional reference model, wherein the viewpoint of the sensor may be used to perform the association.

In some embodiments of the present disclosure, the step of determining the viewpoint of the sensor may further comprise the following sub-steps. The first sub-step may include identifying one or more feature pairs in the three-dimensional reference model. The three-dimensional reference model may be established using information from a geospatial intelligence system database. The next sub-step may include identifying one or more feature pairs in a target image. The feature pairs identified in the three-dimensional reference model and in the target image may be characterized such that they are invariant with the rotation and scale of the reference model and the target image. Next, for each feature pair in the target image, the method may (1) associate the feature pair in the target image with one of the feature pairs in the three-dimensional reference model; (2) estimate an angle associated with the feature pair in the target image; (3) generate a three-dimensional geoarc surface associated with the three-dimensional reference model, wherein the geoarc surface may represent relationships between the feature pair in the target image and the estimated angle. The next sub-step may include identifying locations in three-dimensional space relative to three-dimensional reference model where two or more three-dimensional geoarc surfaces overlap. In some embodiments of the present disclosure, generating a three-dimensional geoarc surface may include representing uncertainty in the estimated angle by varying the thickness of the geoarc surface. In some embodiments of the present disclosure, the generated geoarc surface may overlap a previously generated geoarc surface, creating a three-dimensional volume.

In some embodiments of the present disclosure, the step of determining the viewpoint of the sensor may further comprise the following sub-steps. The first sub-step may include selecting as the determined viewpoint of the sensor a location where the most geoarc surfaces overlap. Next, for each feature pair in the target image, the method may refine the generated three-dimensional geoarc surface by ignoring or removing portions of the three-dimensional geoarc surface which relate to viewpoints that are incorrect based on checks with reference data. The next sub-step may include validating the determined viewpoint of the sensor by referring to reference data to predict additional features that should be visible in the target image if the determined viewpoint of the sensor is correct. In some embodiments of the present disclosure, the step of determining the viewpoint of the sensor may include partitioning the three-dimensional reference model into a number of regions and determining a potential viewpoint of the sensor within one or more of the regions.

In some embodiments of the present disclosure, the step of generating a composite three-dimensional representation may further comprise the following sub-steps. The first sub-step may include determining the location of the sensor and the angle of the sensor relative to the composite three-dimensional representation. The next sub-step may include determining the location of one or more objects visible in the target image relative to the composite three-dimensional representation by, for each object, adding a translational offset to the location of the sensor. The next subs-step may include projecting in real time one or more objects associated with the target image into the 3D composite scene.

In another advantageous embodiment, a method for image registration may be executed (for example, at least in part in a data processing system such a computer), wherein the method comprises the following steps. The first step of the method may include identifying one or more feature pairs in a three-dimensional reference model. The next step of the method may include identifying one or more feature pairs in a target image. Next, for each feature pair in the target image, the method may (1) associate the feature pair in the target image with one of the feature pairs in the three-dimensional reference model; (2) estimate an angle associated with the feature pair in the target image; (3) generate a three-dimensional geoarc surface associated with the three-dimensional reference model, wherein the geoarc surface may represent relationships between the feature pair in the target image and the estimated angle; and (3) identify locations in three-dimensional space relative to three-dimensional reference model where two or more three-dimensional geoarc surfaces overlap. In some embodiments of the present disclosure, uncertainty in the estimated angle may be represented by varying the thickness of the geoarc surface. In some embodiments of the present disclosure, the generated geoarc surface may overlap a previously generated geoarc surface, creating a three-dimensional volume.

In another advantageous embodiment, an air vehicle is described, comprising a sensor adapted to capture images, and a data processing system communicatively coupled to the sensor. The data processing system may be programmed to establish a three-dimensional reference model of a scene. The data processing system may be further programmed to acquire a target image of the scene from the sensor. The data processing system may be further programmed to determine the viewpoint of the sensor that captured the target image using one or more three-dimensional geoarcs, wherein the viewpoint of the sensor may be determined relative to the three-dimensional reference model. The data processing system may be further programmed to generate a composite three-dimensional representation of the scene by associating data from the target image with data from the three-dimensional reference model, wherein the viewpoint of the sensor may be used to perform the association.

In some embodiments of the present disclosure, to determine the viewpoint of the sensor, the data processing system may be further programmed to identify one or more feature pairs in the three-dimensional reference model. The data processing system may be further programmed to identify one or more feature pairs in a target image. For each feature pair in the target image, the data processing system may be further programmed to (1) associate the feature pair in the target image with one of the feature pairs in the three-dimensional reference model; (2) estimate an angle associated with the feature pair in the target image; (3) generate a three-dimensional geoarc surface associated with the three-dimensional reference model, wherein the geoarc surface may represent relationships between the feature pair in the target image and the estimated angle. The data processing system may be further programmed to identify locations in three-dimensional space relative to three-dimensional reference model where two or more three-dimensional geoarc surfaces overlap. In some embodiments of the present disclosure, to generate a composite three-dimensional representation of the scene, the data processing system may be further programmed to project in real time one or more objects associated with the target image into the 3D composite scene.

In some embodiments of the present disclosure, the sensor may be located on the air vehicle such that landscapes and scenes may fall within the sensor's field of view. In some embodiments of the present disclosure, the data processing system may include a memory, wherein the memory may store reference data, including the three-dimensional reference model, and wherein the memory may store images captured by the sensor.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Several features and advantages are described in the following disclosure, in which several embodiments are explained, using the following drawings as examples.

FIG. 5 shows illustrations of example geometric shapes that may aid in describing one or more embodiments of the present disclosure.

DETAILED DESCRIPTION

Figure 1:
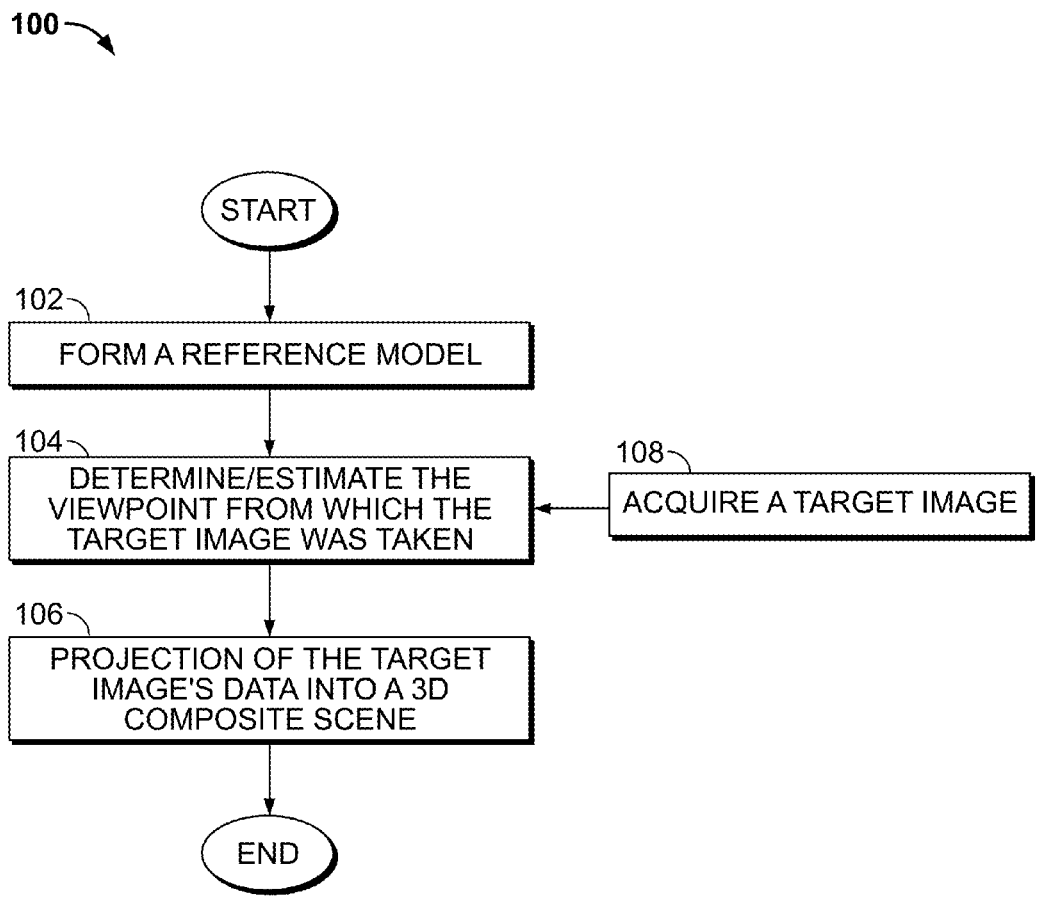
FIG. 1 is an illustration of a high level flowchart showing example steps performed according to one or more embodiments of the present disclosure.

Even though techniques exist for image registration, there are several disadvantages to current techniques. For example, many current techniques attempt to find correspondences between specific features in order to perform direct registration. These techniques may require complex computations because of the high number of data points that may need to be considered in order to validate that two features match. Some current techniques need to transform images, for example between target images obtained from a camera or sensor and reference images or models. Additionally, these techniques require large scale searches through reference image databases to find matching features, and complex algorithms that match a target image with visually similar images or models in the reference databases. These techniques use a variety of complex methods to determine similarity, including the "bag-of-words method" (detecting a number of similar features within an image to gauge overall similarity). These complex methods may suffice for well-photographed locations and urban areas, but in more rural areas, the databases may be insufficiently populated. In addition, finding correspondences between specific features may be difficult if the features are generated from recordings made at different wavelengths or different sensor types.

Current geometry-based methods also have disadvantages. These techniques are most widely used in urban settings where accurate geometric models can be generated from real-world (or ground-level) structural data. Registration techniques then use distinctive points, repeated patterns, and line clustering similarities to detect 3D alignment between a target image and a stored model. While these techniques have shown promising results, they are not suitable for arbitrary scenes or areas without significant ground-level image coverage to form reference models and reference databases. Additionally, current techniques may detect and match subregions in the images, and these matched subregions may confuse the registration algorithm and result in incorrect registration of the whole image.

Furthermore, current techniques may not be capable of accurately registering images acquired using different modalities (e.g., images acquired with different sensors or images captured in different formats or dimensions) because when registering images of different modalities, assumptions that current techniques rely on may not prove to be true. For example, many conventional image registration techniques assume that the image intensities of corresponding image elements (e.g., pixels, voxels and the like) are identical in the images to be registered. Additionally, images of different modalities may have different resolutions, dimensions or formats, or they may have been recorded from widely varying viewpoints.

Current geolocation registration techniques also have limitations. For example, they do not provide accurate registration based on varying viewpoints at which a photograph was taken. Additionally, because massive databases of images of other information are required, these techniques are limited to regions with high populations such as urban areas or other areas that attract many visitors (so that the visitors can contribute images to the databases). Furthermore, the accuracy of techniques that rely on direct feature or pattern matching may degrade with changes in lighting, season or weather. These techniques also suffer from scalability issues due to the massive number of reference images needed.

Therefore, a more accurate, flexible and scalable technique for multi-modal image registration is desirable, a technique that does not need to rely on direct feature matching and does not need to rely on precise geometric models. The present disclosure describes a technique, method and/or system to enable the registration (fusion) of multi-modal images of a scene with a three dimensional (3D) representation of the same scene using, among other information, viewpoint data from a sensor that generated a target image, as well as GeoArcs (also referred to as geoarcs).

Unlike existing viewpoint registration systems, the solutions described in this disclosure need not attempt to perform direct feature matching or find correspondences between target images and highly detailed reference models. The solutions of the present disclosure may be patterned on how humans locate themselves within a geographic location. Studies in ecological psychology have shown that humans localize themselves in unfamiliar environments by using primarily a topographical map of the area. Humans do not form complex models of their surroundings and attempt to directly match specific features in these models to stored reference data. Instead, humans follow an iterative evidence-gathering process in which they consider relationships between a small number of observable generic landmark features. They then form a hypothesis and try to validate it using reference data. In a similar manner, the techniques described herein involve accruing evidence, generating multiple hypotheses, and then generating a final geolocation area using the hypothesis that best satisfies multiple constraints imposed by the reference model and perhaps other reference data. This technique avoids the need to solve the intense feature-to-feature correspondence problem which is the basis for current image registration systems. The solutions described herein may only need to determine if a feature in the target image is of the same type as in the reference model and whether a feature has similar relationships with other features. As long as the same feature types (for example based on edges and corners) can be detected in both the target image and the 3D reference model of the scene, the target and the reference can be fused into a composite 3D representation.

The registration techniques described herein allow for accurate and flexible fusion of multi-modal data, such as 2D data (for example EO, IR, and SAR data) and 3D data (for example LIDAR data). EO (Electro-optical) sensors are electronic detectors that convert light, or a change in light, into an electronic signal. They are used in many industrial and consumer applications. Infrared (IR) sensors are electronic devices that measure infrared light radiating from objects in its field of view. SAR (Synthetic Aperture Radar) is an electromagnetic imaging sensor often used in remote sensing applications. A SAR sensor may be mounted on an aircraft or a satellite, and is used to make a high-resolution image of the earth's surface. LIDAR (Light Detection And Ranging, also LADAR) is an optical remote sensing technology that can measure properties of a target by illuminating the target with light, often using pulses from a laser. Sensors of the type previously described may be integrated into the systems and solutions described in this disclosure. One or more sensors of the type described (or other types) may be coupled to a system that embodies some or all of the solutions described herein. For example, a 2D image sensor may be coupled to a general purpose computer that includes a processor that may execute computer code, whereby the computer, as the processor executes the computer code, may accept information from the 2D image sensor and proceed to carry out solutions of the present disclosure.

Throughout this disclosure, the term fusion refers to the process of combining and registering one or more target images of a scene with one or more reference images and/or 3D representations of a scene. The term geo-registration may also be used throughout this disclosure to refer to the process of registration where the registration occurs between a target image and a stored 3D scene representation that has been matched with real-world geographical locations and structures. Additionally, it should be understood that although the descriptions herein may refer to images, such as target images created by sensors, the solutions of the present disclosure may also apply to video. Therefore, the present disclosure contemplates a technique, method and/or system to enable the fusion of video of a scene with a 3D representation of the same scene. Although, for clarity, the present disclosure will refer mostly to target images, the solutions herein may work with target video as well. Additionally, although this disclosure mostly describes fusion of target images and/or video with a reference 3D representation, it should be understood that the reference representation may also be a 2D image instead of a 3D representation.

The registration techniques of the present disclosure may be comprised of three main steps, as shown in FIG. 1. FIG. 1 is an illustration of a high level flowchart 100 showing example main steps performed according to one or more embodiments of the present disclosure. The first main step is a reference model step 102 that includes forming a 3D reference model of a scene. The second main step is a viewpoint determination step 104 that includes estimating the 3D geospatial viewpoint of a sensor that generated a target image. The third main step is a projection step 106 that includes projecting the target image's data into a composite 3D scene representation.

The first main step of the registration techniques described herein is the reference model step 102. This main step may further include two sub-steps. First, a 3D model of a scene may be created, referred to as a reference model. The information used to create a 3D model may come from, for example, a reference map that correlates particular features with locations within a 3D space. In one example, the information used to create a 3D model may come from a Geospatial Intelligence System database, a database that may be maintained by a government agency or some other entity and may include a comprehensive collection of imagery, feature, and elevation data related to a variety of locations on Earth. The Geospatial Intelligence System database may correlates particular real-world features with their geolocations.

In the next sub-step, the locations of features (or landmarks) of various types in the 3D reference model may be identified and marked as ideal candidates for matching a target image to the 3D reference model. In order to cope with potential large variations in the viewpoint from which a target image may be captured, these features may be characterized or stored in a way such that they are invariant with image rotation and scale. For example, the solutions described herein may only need to determine if a feature in the reference model is of the same type (i.e., similar curves and/or corners) as in the target image and whether a feature has similar relationships with other features.

Figure 2:
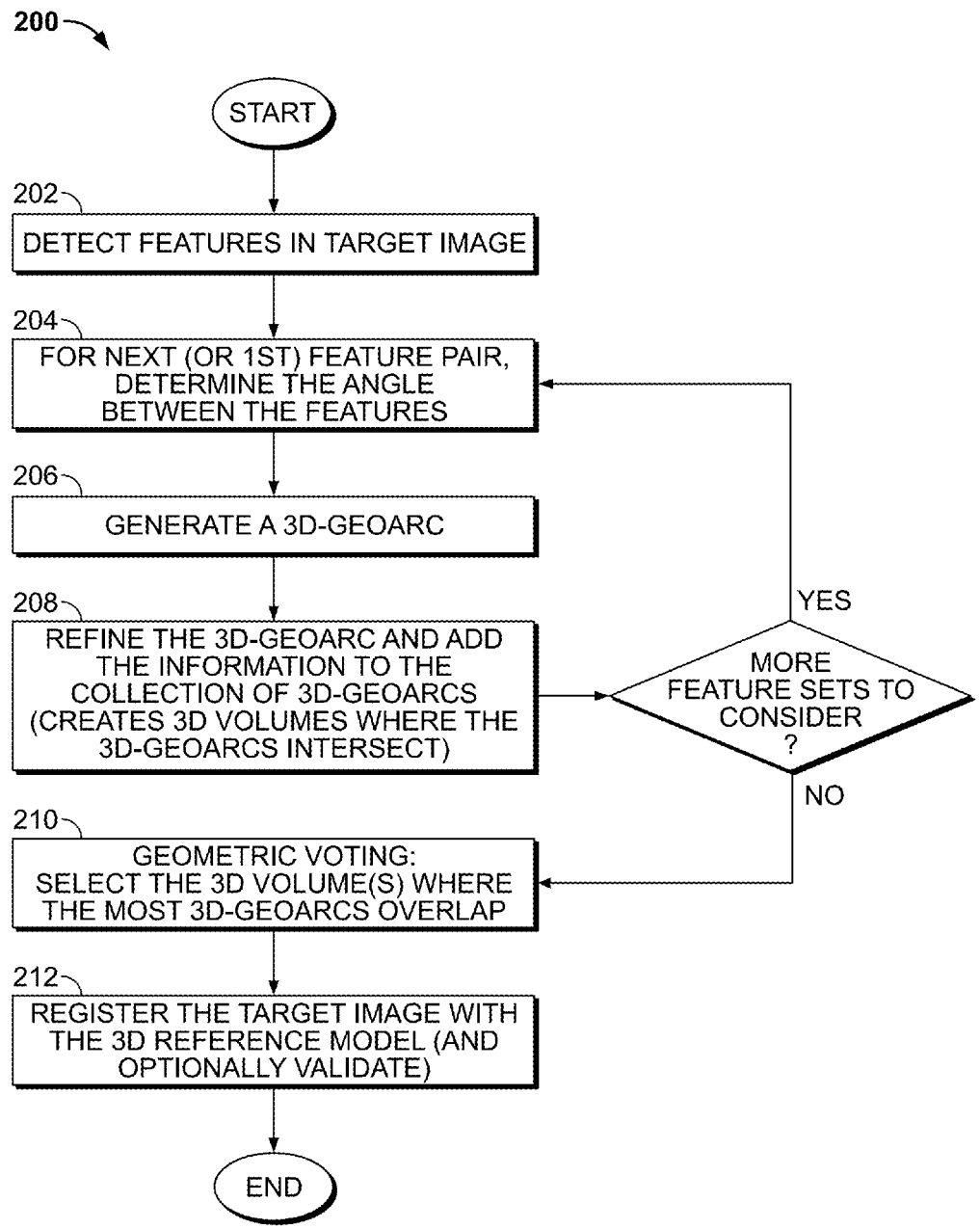
FIG. 2 is an illustration of a high level flowchart showing example steps performed according to one or more embodiments of the present disclosure.

The second main step of the registration techniques described herein is the viewpoint determination step 104 which includes estimating the viewpoint of a sensor that generated a target image. Determining the viewpoint of a sensor may include determining the sensor's geolocational information (the sensor's location in a pre-defined 3D reference scene) as well as determining the viewing direction (angle) of the sensor. More details can be seen in FIG. 2, which is an illustration of a high level flowchart 200 showing example sub-steps performed according to one example viewpoint determination step. In this example, the viewpoint determination step may include six sub-steps: (1) Sub-step 202—given a target image, detect features in the target image that relate to the types of features identified in the 3D model; (2) Sub-step 204—determine angles between feature-pairs in the target image using the calibrated field of view of the sensor; (3) Sub-step 206—for each feature-pair in the 3D model forming pairs of the same types as in the target image, generate a 3D-GeoArc (described below) using the measured target image feature-pair angles and uncertainties; (4) Sub-step 208—refine the 3D-GeoArc results by segmenting out portions of each 3D-GeoArc which represent viewpoint locations that are not consistent with reference data; (5) Sub-step 210—find the 3D volumes relative to the 3D reference model space where the most 3D-GeoArcs overlap (geometric voting), thereby determining an approximate viewpoint location that is most consistent with the evidence; and (6) Sub-step 212—register the target image with the 3D model and, optionally, validate the registration.

Regarding the first sub-step 202, detecting features in the target image, it is first assumed that a target image was taken by a camera or a sensor at some point. Referring to FIG. 1 momentarily, it can be seen that at some point a target image must be generated (task 108), although in some embodiments of the present disclosure, the image registration process may be flexible as to the precise time at which task 108 occurs. The target image may be captured in real time or main step 104 may use a pre-captured target image. Turning back to FIG. 2, given a target image, sub-step 202 includes detecting features in the target image. The solutions of sub-step 202 may only need to determine if a feature in the target image is of the same type as a feature in the reference model. For example, as long as a feature in the target image has the same feature type (such as similar edges and/or corners), the feature may be detected in the target image and its spatial relationship with other features is checked against similar feature relationships in the reference model. This technique avoids the need to solve the intense feature-to-feature correspondence problem which is the basis for current image registration systems. Although this same-type relationship technique of feature matching may be less accurate than intense feature-to-feature correspondence methods, uncertainty in the matching may be dealt with in other steps of the registration process.

In some embodiments of the present disclosure, the reference model may be partitioned into a number of regions or cells and the feature-detection (sub-step 202) may be performed separately within each region or cell. A reason for this partition may be that the number of feature relationships to be considered within an entire reference model is potentially combinatorial in nature. For example, considering the entire reference model, if N landscape features existed in the reference model, and r features are visible in the target image, then a registration technique may need to develop hypotheses on all $C(N, r)=N!/(N-r)!r!$ r-element subsets of these features, and rank them for localization consistency. This may give the best possible localization results, but such a technique may be inefficient.

Some embodiments use a hierarchical approach to avoid considering all feature/viewpoint combinations at once, thus limiting the potential for a combinatorial explosion in sensor-position hypotheses. An example hierarchical approach may first perform a coarse localization step whereby larger, more distinct feature-pairs are used to partition the global search into coarse regions. A coarse region may be characterized by high confidence that the viewpoint is located within the region, but low precision as to where within the coarse region the viewpoint is located, perhaps because of the low number of distinct features and the size of such features. Examples of large, distinct feature that may be used for coarse localization are mountain tops and large buildings.

Within each coarse region, a hierarchical approach may perform a fine localization step whereby smaller feature pairs that are consistent with the larger feature pairs are used to increase the precision of the viewpoint location. Fine localization steps may proceed in order of coarse localization quality of course regions. Additionally, these fine regions may be limited based on visibility constraints. For example, even though the fine localization step may consider some smaller features, not all of the features may be visible due to obstructions and the like. Additionally, a hierarchical approach may consider the "visible radius" of one or more feature types and then partition the reference model into cells that correlate to the visibility of one or more features. The visible radius may be the maximum distance that the sensor may be located away from a feature and still be able to capture it. The shape of a cell may be circular, for example, in order to match a visibility radius most precisely, or it may have a different shape (a square for example). Different cells that correlate to the visibility of different features may overlap.

Whether referring to fine regions or visibility cells, or a combination of both, the registration algorithms and techniques described herein may be performed on each region and/or cell individually. Within each region and/or cell, the number of possible features is constrained and the number of potential hypotheses may be reduced significantly. For example, in a case where K cells exist, a hierarchical approach could reduce the asymptotic complexity of the algorithm to $KC(N/K,r)$, which is a large improvement. Even though dealing with multiple reference model cells and/or regions may initially result in a larger number of possible final viewpoints, this uncertainty is dealt with as the foregoing explained, and will be further dealt with in later sub-steps.

Figure 3A:
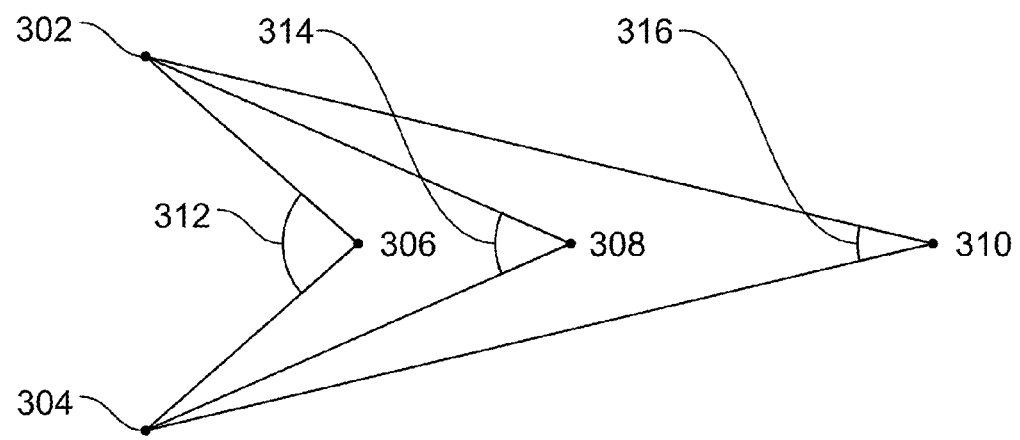
FIG. 3 shows illustrations of example geometric shapes that may aid in describing one or more embodiments of the present disclosure.
Figure 3B:
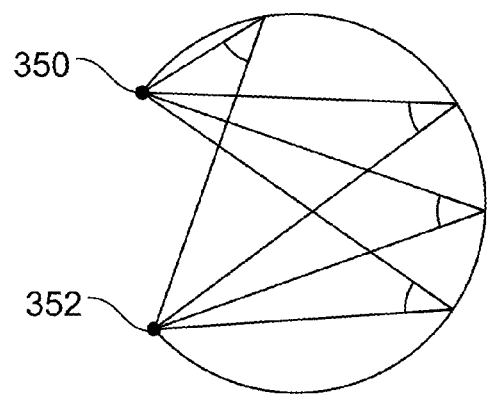

To further understand the rest of the sub-steps (sub-steps 204-212), a discussion of GeoArcs (also referred to as Geolocation Arcs or geoarcs) may be useful because GeoArcs may be used to define the relationship (also referred to as a hypothesis) between feature-pairs. A description of 2D-GeoArcs will follow first. FIG. 3 shows illustrations of geometric shapes that may aid in describing GeoArcs. FIG. 3A includes two points 302, 304 that may represent feature-pairs. Throughout this disclosure, two features in an image that are used to create a GeoArc or a hypothesis may be referred to as a feature pair. FIG. 3A also includes multiple points 306, 308, 310 (viewpoints) of varying distances from the two features (points 302, 304) and two connection lines that connect each viewpoint to the two features. It can be seen that as the viewpoint gets further away from the two features, the angle (angles 312, 314, 316 are shown for points 306, 308, 310 respectively) between the two connection lines associated with the viewpoint gets smaller. Furthermore, as shown in FIG. 3B, for a given angle between the two connection lines, there are infinite viewpoints (which lie along a circular arc) that may allow for connection lines with the given angle. It should be understood, in reference to the foregoing description, that the term "connection line" does not mean a physical line or connection. Instead it refers to geometric idea of an imaginary straight line that may extend between two points.

Figure 4A:
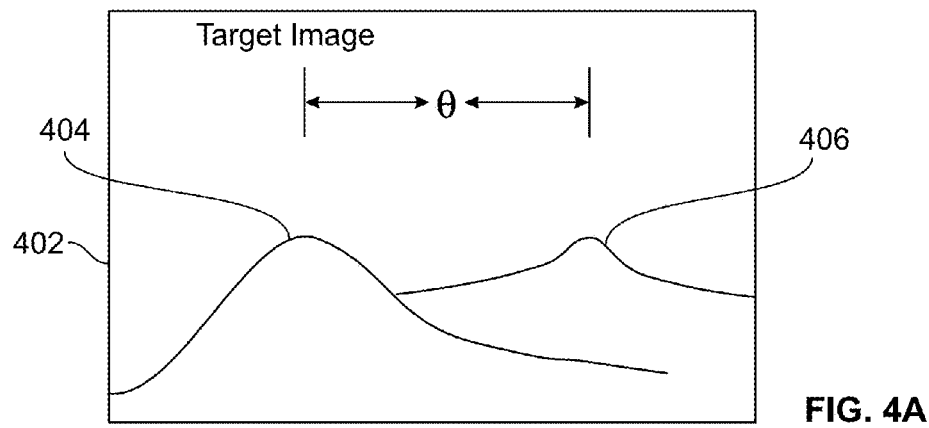
FIG. 4 shows an example flow of information that may aid in describing one or more embodiments of the present disclosure.
Figure 4B:
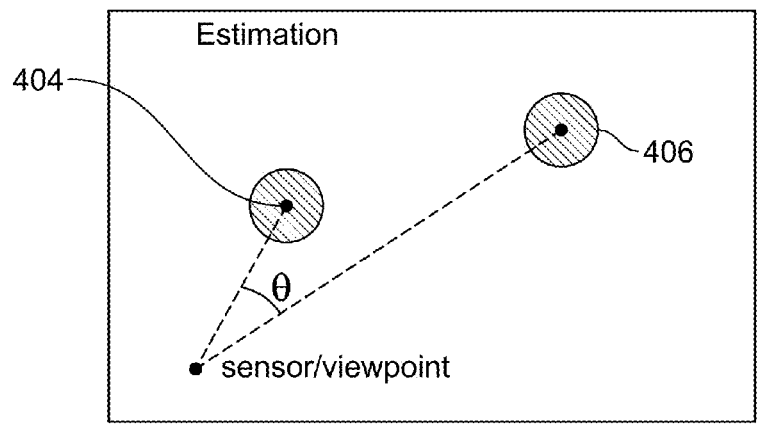
Figure 4C:
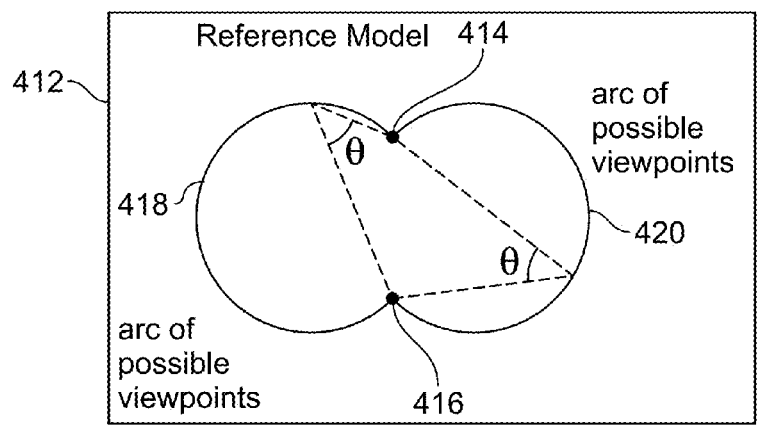

Referring to FIGS. 4A-C, and considering the foregoing description, it can be seen how information from a target image (shown in FIG. 4A) may be projected into a reference model (shown in FIG. 4C) using a 2D GeoArc. Assume that a target image was taken with a sensor or a camera (for example, of a plot of land). FIG. 4A shows an example target image 402 that may have been taken by a camera or sensor. When the camera or sensor takes the image 402, it may detect features 404 and 406, and it may also estimate, for example by scanning details about the target image, the angle (θ) between imaginary connection lines (not shown in FIG. 4A) that extend between the sensor (not shown) and features 404 and 406. FIG. 4B further shows, conceptually, how the sensor may estimate the angle (θ) between imaginary connection lines that extend between the sensor and features 404 and 406.

In some embodiments, in order to estimate the angle between features, the registration techniques may utilize details about the calibrated field of view (FOV) of the sensor. In some examples, the FOV details associated with the camera may be known ahead of time. FOV details include, for example, the maximum angle/view (width and height) of a scene that a sensor can capture at one time. For example, information about a camera's lens, focal length, sensor size and the like may provide useful FOV details. Alternatively, the FOV of a sensor can be measured. In some embodiments, the FOV can also be estimated by adjusting its value so as to maximize the consistency and geospatial precision as measured by the overlapping of GeoArcs generated from the observed data. In other embodiments, the FOV of the sensor may be estimated by scanning details of an image after the image is created. Once the maximum angle/view of a sensor is known (in other words, the full extent of the sensors viewable range), then sub-angles can be estimated for objects that fall within the sensor's maximum viewable range.

Assuming that a reference image exists (for example an aerial view of a plot of land), that reference image may include a number of features whereby a number of 2D-GeoArcs can be generated based on pairs of features. Assuming that features 404 and 406 detected in the target image 402 can be matched to two reference features 414 and 416 in the reference image 412 (shown in FIG. 4C), the registration technique may compute two circular arcs 418, 420 (a GeoArc) that map to the reference model 412. The two arcs 418, 420 show the possible viewpoints where the sensor may have been located relative to the reference image when the sensor captured the target image. Thus, a 2D-GeoArc refers to the circular arc(s) (potentially more than one physical arc) of possible 2D locations in a reference image that are consistent with a particular angular relationship between two features in the target image. All locations on the 2D-GeoArc see the same angle between the two features. The 2D-GeoArc associated with the reference image limits the possible sensor viewpoint locations in 2D space.

Thus, by matching an angular relationship between two features detected in the target image with an angular relationship from the reference image, and considering constraints from the reference image defined by a GeoArcs associated with the detected angle from the target image, a geolocation hypothesis may be defined. The geolocation hypothesis is a set of locations in the 2D space from where the target image may have been taken. For example, a geolocation hypothesis may be represented by the set $\{(LFr_1, LFr_2), (LFq_1, LFq_2), \theta\}$, where $LFr_i$ is a reference model feature, $LFq_j$ is an input image feature, and $\theta$ is the angular separation between $LFq_i$ and $LFq_j$.

It should be understood, throughout this disclosure, that when reference is made to decisions, estimations and/or computations being performed by a sensor, those decisions, estimations and/or computations may either be performed by equipment, circuitry or code within the sensor itself, or alternatively by another apparatus that analyzes the image after the sensor has captured the image. For example, in some embodiments, circuitry or equipment within the sensor may estimate the angle ($\theta$) between imaginary connection lines. In other embodiments, another apparatus, such as a computer program run on a data processing system, may perform such estimation.

The same process as was explained above to create a 2D Geo-Arc/hypothesis may be performed for more feature relationships, and thus more GeoArcs/hypotheses may be generated. The 2D-GeoArcs generated by each feature relationship mapping may then overlap (as shown in FIG. 5A), generating a Geolocation Likelihood Map (GLM). For example, referring to FIG. 5A and assuming perfect 2D-GeoArcs, the GLM 502 may be a point that consists of the intersection of two or more 2D-GeoArcs. If the 2D-GeoArcs are not perfect, the GLM may represent an area in 2D space within which there is a high likelihood that the sensor viewpoint exists. In this case, additional GeoArcs may (although not necessarily) providing additional evidence for finer localization, resulting in a smaller GLM area. Thus, the region in 2D space where the most 2D-GeoArcs overlap may present the best evidence to determine the Geolocation Area (GA). The GA is the final location in the 2D space that the registration process determines has the highest likelihood of being the place where the target image was taken.

Any registration technique will likely have to deal with some level of uncertainty, meaning that the GeoArcs may not be perfect lines/arcs. For example, one potential source of error in the described techniques may be that the sensor that captures the target image (or a method that scans a target image later) must approximate the angle between the two features because it may difficult to ascertain the exact distance and orientation between the sensor and the features. As can be seen in FIG. 5B, for example, errors or uncertainties in the sensor data may introduce uncertainties into the 2D-GeoArc generation process. As FIG. 5B shows, uncertainties may result in a larger range of possible 2D locations associated with each 2D-GeoArc, which accordingly may result in a "thickness" associated with the GeoArc when it is mapped onto the reference image. Therefore, as shown in FIG. 5C, when uncertainty is introduced into the multiple-GeoArc registration process, the intersection of two 2D-GeoArcs may form an intersection area 510 instead of an intersection point as shown in FIG. 5A. However, as more feature relationships are analyzed and as more GeoArcs are mapped to the reference image, the intersection area may become relatively small and thus the overall level of uncertainly regarding the GA may be minimized.

Figure 6:
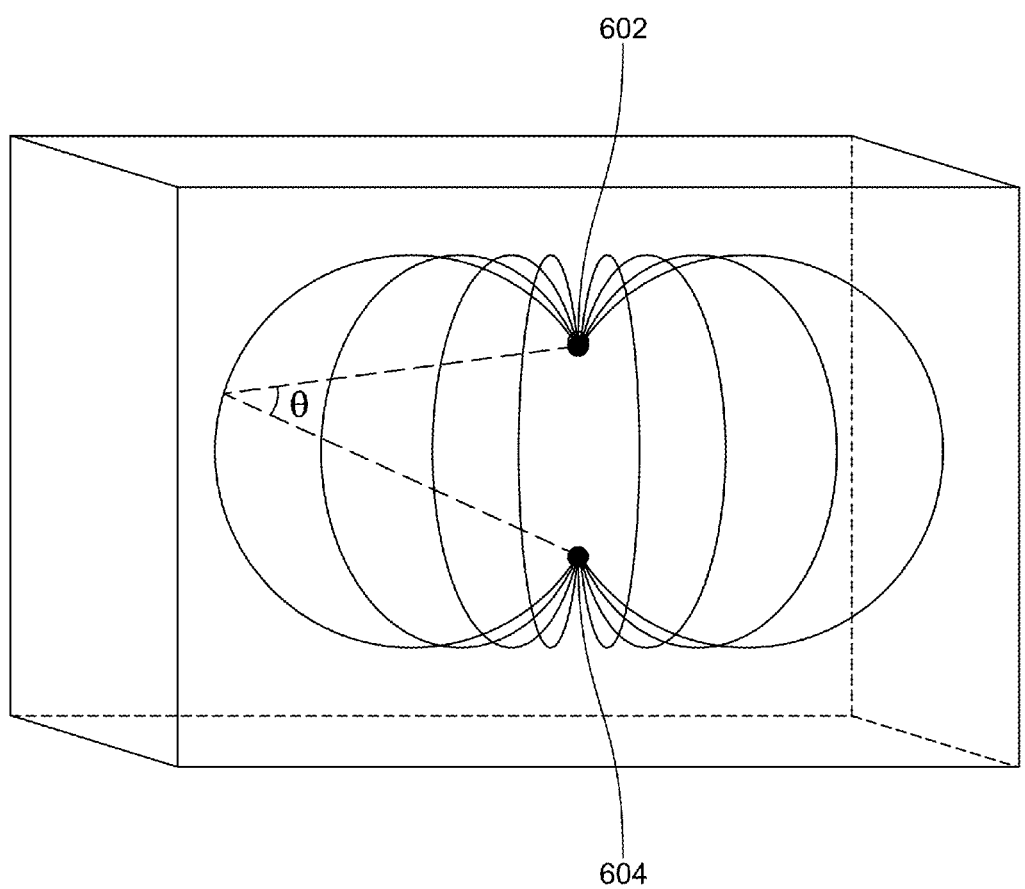
FIG. 6 shows illustrations of example geometric shapes that may aid in describing one or more embodiments of the present disclosure.

With an understanding of 2D-GeoArcs laying a foundation, the following will describe how the 2D-GeoArc concept may be extended to 3D-GeoArcs. FIG. 6 shows an angular separation ($\theta$) between a pair of features 602, 604 that exist in 3D space. As shown in FIG. 6, a 3D-GeoArc is a surface formed by "sweeping" or rotating a 2D-GeoArc (in a plane that contains the feature pair) about the line (or axis) connecting the feature pair. All viewpoints on the 3D surface see the same angle between the two features. Accordingly, similar to the 2D-GeoArc concept, the observed angular separation between a pair of features in a target image may define a 3D-GeoArc associated with a 3D reference model, and the 3D-GeoArc limits the possible sensor viewpoint locations in 3D space. Therefore, for the 3D case, the feature pair relationship/association hypothesis is a correspondence between a pair of features in the target image (for example a 2D image) and a feature pair in a 3D reference model. This association (hypothesis) defines a surface in 3D space on which the true geolocation may be located, denoted as a 3D-GeoArc.

Figure 7:
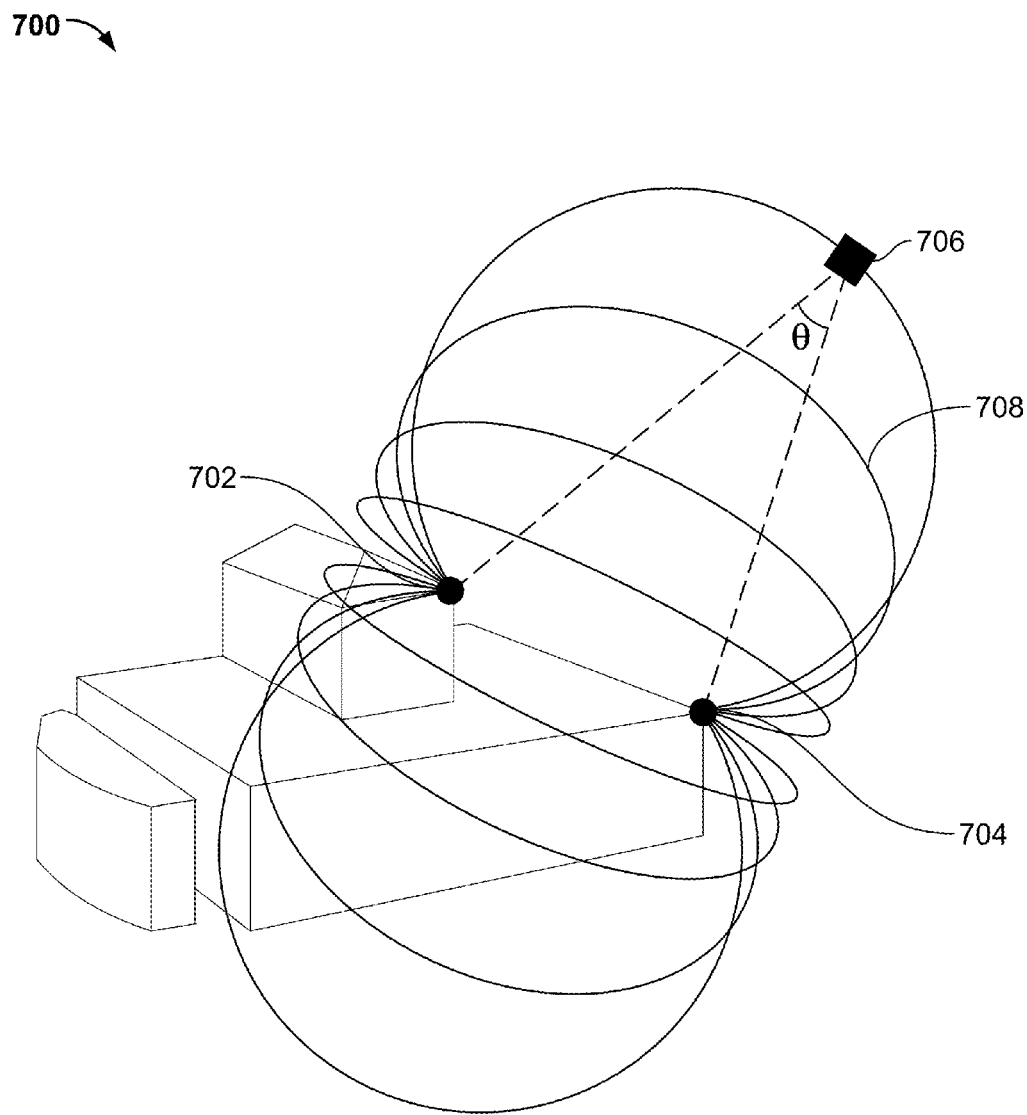
FIG. 7 shows an example scene and the example application of techniques of one or more embodiments of the present disclosure.

FIG. 7 shows an example 3D scene 700 where the registration techniques using 3D-GeoArcs herein described may be useful. As can be seen in FIG. 7, two corners 702, 704 of a building may have been identified as a feature-pair by a sensor 706 as it captured a target image of the scene. Then, the sensor may have estimated the angle of separation ($\theta$) between the feature pair. Then assuming that the features (corners 702, 704) can be related to two similar features in a 3D reference model, and given the estimated angle ($\theta$), the registration technique may create a 3D-GeoArc 708 that resembles a "degenerate torus" with a torus-hole size of zero. The surface of this "degenerate torus" may define the range of 3D locations within the 3D reference model where the sensor could have been located when it captured the target image of the scene.

Additionally, regarding the registration techniques using 3D-GeoArcs herein described, additional feature-pairs in the target image may be identified, and as additional feature relationships are analyzed between the target image and the 3D reference model, additional hypotheses/3D-GeoArcs may be mapped to the 3D reference model. Overlapping or intersecting 3D-GeoArcs create 3D Geolocation Likelihood Maps (3D-GLMs). Assuming no uncertainty in the feature-pair angles, the intersection of two 3D-GeoArcs results in a curved line in 3D space, and the intersection of three GeoArcs results in a point. However, in reality, 3D-GeoArc registration may have to deal with uncertainties that may result from errors or uncertainties in the target image sensors (or devices that analyze a target image later). With regard to the 3D-GeoArcs, these uncertainties may "thicken" a GeoArc's surface, which results in a 3D-GeoArc intersection volume if two or more 3D-GeoArcs intersect or overlap. Thus, a 3D-GLM may represent a volume in 3D space within which there is a high likelihood that the sensor viewpoint exists. Additional 3D-GeoArcs may (although not necessarily) providing additional evidence for finer localization, resulting in smaller 3D-GLM areas. Thus, the volume in 3D space where the several 3D-GeoArcs overlap may be a good candidate for the 3D Geolocation Volume (3D-GV). The 3D-GV is the final set of locations in the 3D space that the registration process determines has the highest likelihood of being the place where the target image was taken.

As a sub-step to the viewpoint determination step 104 (see FIG. 1), each 3D-GeoArc may go through a refining process after the 3D-GeoArc has been generated and before the 3D-GeoArc is added to the collection of 3D-GeoArcs that may be considered in the voting sub-step. It may be the case that for a particular generated 3D-GeoArc, it would be inefficient (or erroneous) to consider points along the full GeoArc as a possible viewpoint locations. Therefore, the refining process may segment out or ignore portions of a 3D-GeoArc which represent viewpoint locations from which the feature pair is not visible due to occlusions (blockages), in other words, viewpoint locations from which important features cannot be detected. Additionally, the refining process may segment out or ignore portions of a 3D-GeoArc which represent viewpoint locations that are not physically possible based on the reference data (for example data originating from a geospatial database). For example, if an object exists (such as a large rock or a building) where a potential viewpoint is hypothesized, that viewpoint may be disregarded. Also, any other information about where the sensor must (or must not) be may help to refine the 3D-GeoArcs.

Additionally, in some embodiments, as explained above, the reference model is partitioned into a number of overlapping cells or regions. Considering only a small number of feature relationships at a time in multiple regions may result in a relatively large number of initial possible viewpoint locations. However, the pool of candidates may be refined (many candidates may be rejected) by performing checks with reference data to predict features which should be visible given a candidate hypothesis. If the predicted features are observed, then they serve as additional evidence to reinforce the hypothesis and allow prediction of additional landmark features. By proceeding to reduce the number of possible locations through multiple iterations of these refinement techniques, the geolocation may be quickly and efficiently estimated without the need to perform global feature matching.

Once, a refined pool of GeoArcs has been added to the collection of GeoArcs that may be considered, the next sub-step may be performed—selecting or "voting" for the most likely geolocation (3D volume) created by overlapping 3D-GeoArcs. This sub-step searches for the geolocation volume that is most consistent with feature pair relationships in both the target data and the reference 3D model of the scene. Each feature pair relationship (3D-GeoArc) imposes geometric constraints on the possible set of sensor viewpoints that are consistent with the relationship. Therefore, the most likely sensor viewpoint may be determined using 3D-GeoArc voting (or geometric voting) to find the viewpoint that most closely satisfies the constraints imposed by the observed feature pair angles in the target image and the 3D reference model.

3D-GeoArc voting (or geometric voting) refers to the process of finding volumes (and ideally one volume) with the most overlapping 3D-GeoArcs. Therefore, a level of certainty regarding the viewpoint location of a sensor in 3D space can be determined by finding the 3D volume where the most 3D-GeoArcs overlap, thereby determining an approximate viewpoint location that is most consistent with the evidence. This geometric voting process adds robustness to the registration process. Despite potential errors in target sensor information, and without a densely populated feature database (required by current registration techniques), the solutions of the current disclosure may still accurately and quickly determine the 3D location of a sensor by relying primarily on readily available geospatial map data, not limited ground-level views.

The final sub-step within the main step of estimating the viewpoint is to register the target image with the 3D reference model and, optionally, to validate the registration. Once the geolocation of the sensor has been determined the camera's orientation (angle) may be determined, for example by referring to the features used to generate the GeoArcs relative to the final viewpoint. Final image registration (fusing the target image and the 3D reference model) may be performed by matching features between the target image and the reference model that correspond to the 3D-GeoArcs that contributed to determining the geolocation of the correct camera viewpoint. In some embodiments, once the final registration process is complete, the 3D reference model may be used again for validation by predicting additional features that should be visible if the registration/viewpoint determination is correct.

The third main step of the registration techniques described herein is the projection step, which includes projecting the target image's data into a composite 3D scene representation based on the 3D reference model. Once the sensor or camera has been localized (viewpoint determination), the projection step may determine the geolocation of one or more objects identified in the sensor's field of view (from the target image). By using information from the camera/sensor, information from the 3D reference model and relationship information accumulated during the viewpoint determination step, the projection step can estimate the spatial position within the 3D composite scene of any pixel of the target image.

In one example, ground plane information is acquired from the 3D reference model. A ground plane may refer to a 3D surface that is most consistent with the ground in the 3D reference model. Then, similar to the way in which angles may be estimated between features in a target image, a sensor may estimate the angle associated with a line of view between the sensor and a pixel in the target image. Then, the projection step may perform a ray tracing technique whereby an imaginary line (or a ray) is extended from the viewpoint/location of the sensor (which may be known) to the ground plane. In this example, each pixel associated with an object on a ground surface may be projected onto a ground plane of the reference model. In another example, a ray may extend until it connects with a building, a bridge or the like, instead of the ground, so that pixels associated with objects on a structures can be projected. In yet another example, a sensor may estimate the angle associated with a line of view between the sensor and a pixel in the target image as well as the distance between the pixel and the sensor. Then the pixel's geolocation in the 3D composite scene may be computed as the geolocation of the camera/sensor (the origin) plus a translational offset (an angle and distance relative to the origin based on angle and distance information estimated by the sensor).

Models or avatars for objects detected in the camera can be projected into the correct locations on the 3D map or model. In this respect, the 3D reference model may serve as a common framework for combining and georegistering 2D multi-modal images and also video to create a composite 3D scene representation. This projection may be done in real time (dynamically) such that objects identified in the target image may be quickly projected into the 3D composite scene, thereby providing a dynamic real-time 3D common operating picture of a scene and a fusion framework for combining multi-modal image data. Moving objects detected in the 2D scene images can be projected into the 3D framework as avatars in real-time.

It should be understood that even though the descriptions of this disclosure may refer to target image data being "projected into the reference model," this phrase should not necessarily be interpreted literally. In some embodiments of the present disclosure, the composite 3D scene representation may be a composition of data that is based on the 3D reference model even though it is a separate composition of data. In these examples, the target image data may be projected into or represented in the composite scene representation.

Tests applying 2D-GeoArcs have demonstrated the feasibility of the registration techniques described herein, and demonstrate robustness in spite of target image sensing errors and other uncertainties. In one test, topographic map data for a 16 km² area in Malibu, Calif. served as the reference model, and a target image was taken with a 45° field of view (FOV) camera located nearby. The test assumed that observable landmark features were distributed randomly within the camera FOV and that the camera had a minimum (near) and maximum (far) range within which features may be detected. For all trials, the test assumed a 20% error in feature angular separation measurement of the FOV estimate. The Geoposition Likelihood Maps (GLMs) were then calculated by superimposing 2D-GeoArcs for various numbers of landmark features detected in the target image. The GeoLocation Area (GA) was then detected by identifying the portion of the GLM with the highest degree of overlapping 2D-GeoArcs. The test included 50 random trials, with a GA determined in each trial.

The results of the tests applying 2D-GeoArcs are shown in FIGS. 8A-C. FIGS. 8A-C show three example views of a reference image (for example, terrain), where each reference image includes one or more Geolocation Likelihood Maps (GLMs), created as a result of the camera detected differing numbers of landmarks in the target image. FIG. 8A shows the results of a test where the camera detected two landmark features 810, 812 and a GLM 802 was created. FIG. 8B shows the results of a test where the camera detected three landmark features 814, 816, 818 and two GLMs 804, 806 were created. FIG. 8C shows the results of a test where the camera detected four landmark features 820, 822, 824, 826 and a GLM 808 was created. In all of the images of FIGS. 8A-C, the dark grey regions mark the GLM(s) (area(s) of likely points where the camera that took the target image may have been located relative to the reference image). As can be seen in the successive images of FIGS. 8A-C, the GLMs (dark grey regions) very rapidly decrease in size as the camera detects more features. When the camera detects two features (FIG. 8A), the GLM 802 is comprised of two full crescent moon shapes (a full 2D-GeoArc). However, when the camera detects four features (FIG. 8C), the GLM 808 is comprised of a relatively small area.

Figure 8D:
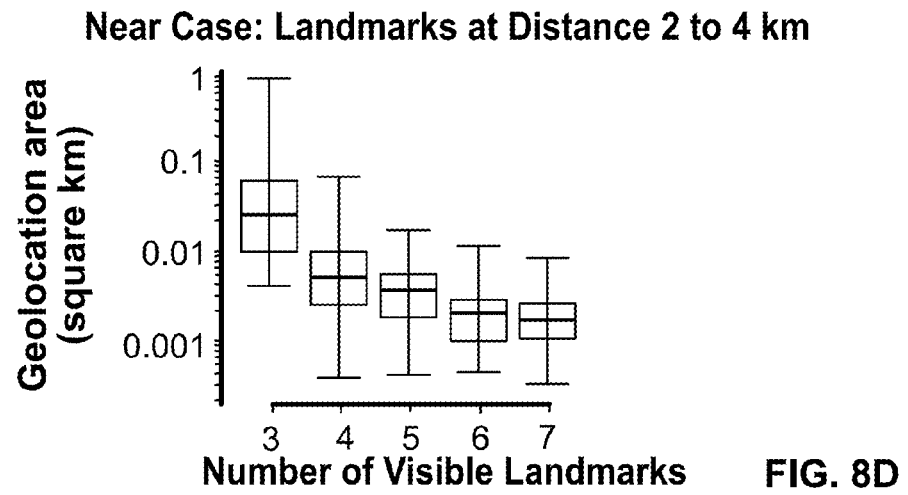
FIG. 8 shows example results of one more example tests.
Figure 8E:
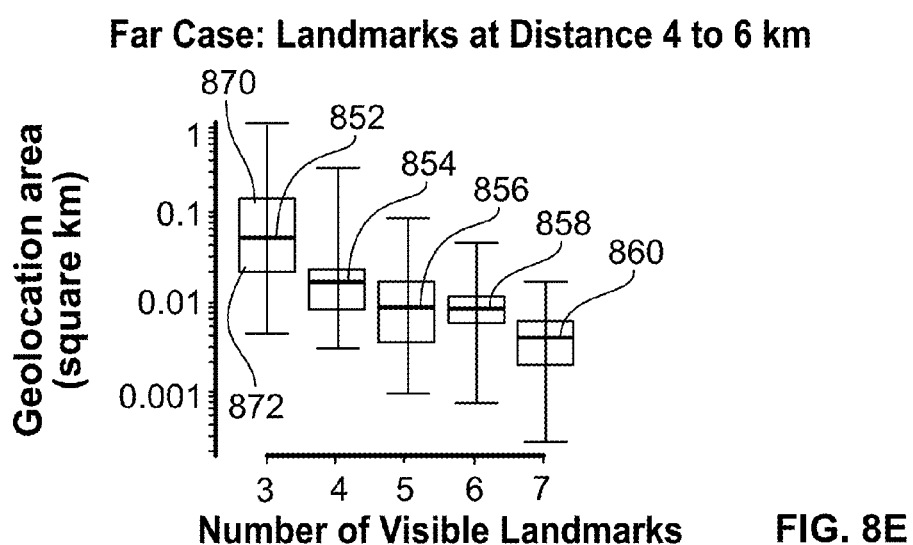
Figure 8F:
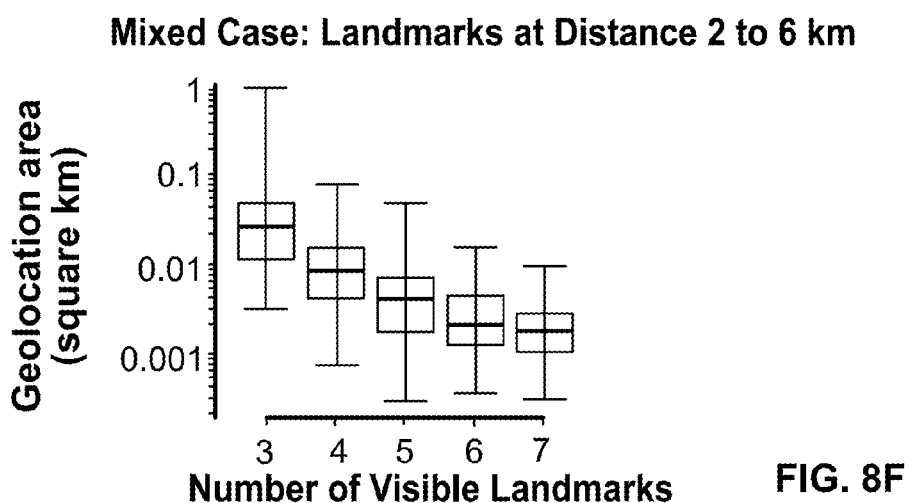

FIGS. 8D-F show "box and whisker" plots of the GA's (final GeoLocation Areas) generated by the 50 random trials as a function of the number of detected features. FIGS. 8D-F shows three plots, one for each of three different distance ranges. FIG. 8D shows a plot (the near case) that represents results where only landmarks at a distance of between 2 and 4 km from the camera were considered. FIG. 8E shows a plot (the far case) that represents results where only landmarks at a distance of between 4 and 6 km from the camera were considered. FIG. 8F shows a plot (the mixed case) that represents results where only landmarks at a distance of between 2 and 6 km from the camera were considered. In general, the plots show that the median GA, denoted by the dark-colored horizontal lines (for example line 852, 854, 856, 858, 860), decreases by 10× as the number of features increases from 3 to 6. For example, in the 4 to 6 km range (FIG. 8E), for 3 features, the median GA is 0.06 km², while for 6 features the median decreases to 0.005 km², a 10× decrease. The decrease between the maximum and minimum GAs, denoted by tops and bottoms of light-colored boxes (for example boxes 870, 872) above and below each median GA line, over the 50 trials is even more dramatic, decreases from the highest maximum to the lowest minimum by almost 100× in going from 3 to 7 features.

Figure 9A:
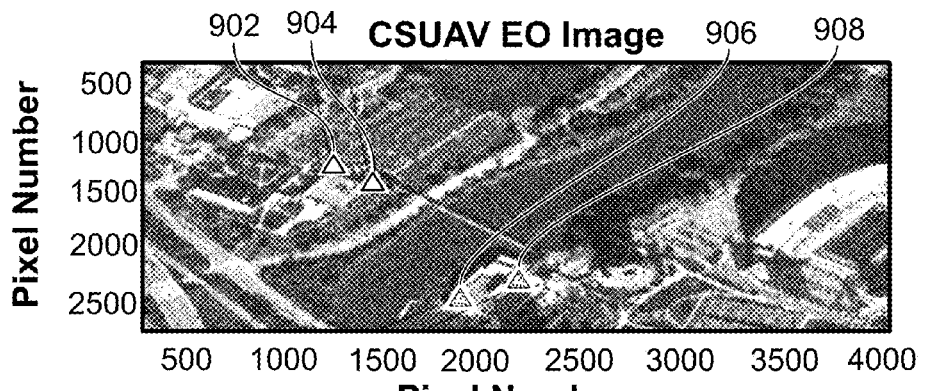
FIG. 9 shows example images and results of one more example simulations.
Figure 9B:
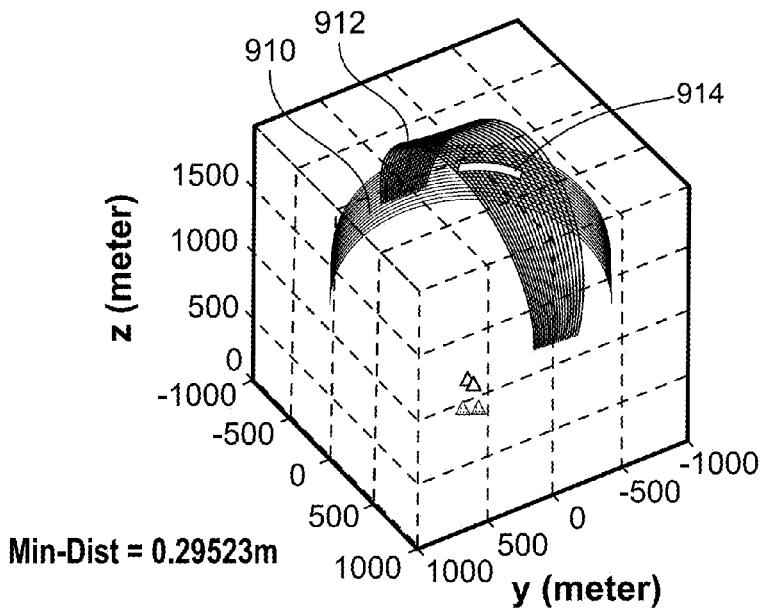
Figure 9C:
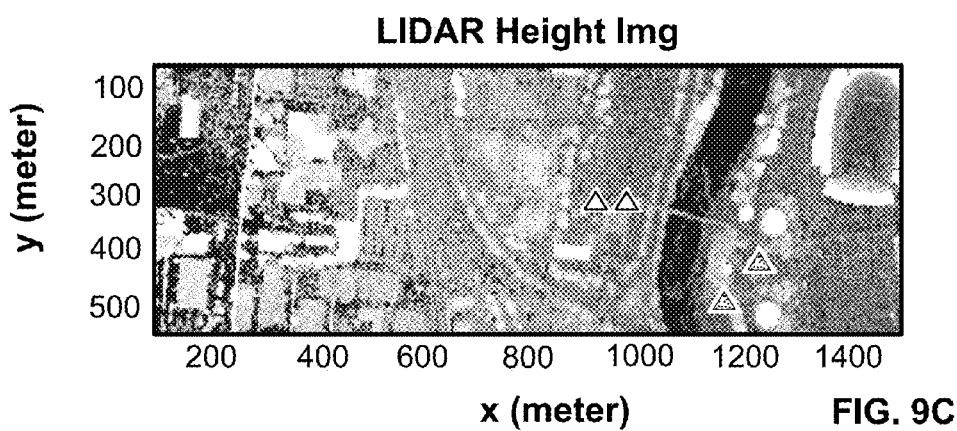

Additionally, simulations applying 3D-GeoArcs have demonstrated the feasibility of the registration techniques described herein. Test images and results from an example simulation are shown in FIGS. 9A-C. In this example simulation, a 2D image of a scene (shown in FIG. 9A) was used as a target image. This 2D image was captured using an EO image sensor. Two feature pairs (902, 904 and 906, 908) were chosen in the target image at different orientations. Then a 3D-GeoArc surface (910, 912) was generated for each feature pair (shown in FIG. 9B). As can be seen in FIG. 9B, the intersection 914 of the two 3D-GeoArc surfaces results in a 3D curved line (or a curved volume if uncertainty were introduced). Therefore, the sensor viewpoint may be estimated by focusing on the intersection 914 of the 3D-GeoArcs, and more 3D-GeoArcs could be considered for additional feature pairs to improve accuracy.

The simulation also tested a process of creating a 3D reference model that estimated feature-types and feature-locations by analyzing LIDAR images of the actual scene (shown in FIG. 9C). The process successfully segmented out ground feature-types and feature-positions from the LIDAR data. The ground features (i.e., roads, parking lot corners and edges) are useful for regional position matching of similar feature-types and feature-positions between 2D EO images and a 3D representation of the same scene.

In addition to the benefits of the registration techniques already described in this disclosure, the following describes further benefits of one or more embodiments. It is to be understood that benefits and advantages described throughout this disclosure are not limitations or requirements, and some embodiments may omit one or more of the described benefits and/or advantages.

One benefit of the solutions of the present disclosure is the speed with which complex scene registrations may be completed, which allows for scalability. Scalability generally refers to the ability to take a technique that works on a small scale and apply it to a problem of a much larger scale. For example, an image registration technique (for example on that utilizes direct feature matching) that works well for a simple reference model and a simple target image may not work well on a complex topography, or in an area without a large database of known landmarks, or when the lighting changes make detected landmarks look different than stored landmakrs. As scalability is important for global localization, authors have developed methods for indexing and matching tens of millions of visual features, and as a result, these methods also require complex feature trees to look up known features. Indexing feature trees may be a complex and computationally intense process, which may directly reduce the storage and matching capabilities of the registration process, which can result in reduced distinctiveness of the feature matching.

The solutions of the present disclosure may require no direct feature matching and may not need to rely on precise geometric models built from ground-level images and 3D scans. Therefore, the solutions described herein may not need to perform matching calculations that are as processor intensive as calculations used by current techniques. Therefore, the solutions described herein may be able to compute the geoloaction of object much quicker than current techniques, which means that the solutions described herein may scalable to handle much more complicated scenarios. Additionally, because the solutions described herein do not rely on direct feature matching, geolocation can be computed regardless of whether a densely populated feature database exists and regardless of changes in lighting, seasons and weather. Likewise, the solutions described here can use of both natural and urban features, which allows for generalization to arbitrary environments.

One or more embodiments of the present disclosure may have a variety of applications, which may further highlight some benefits of the solutions described herein. It is to be understood that the applications, benefits and advantages described throughout this disclosure are not limitations or requirements, and some embodiments may be more suited to some applications.

Figure 10:
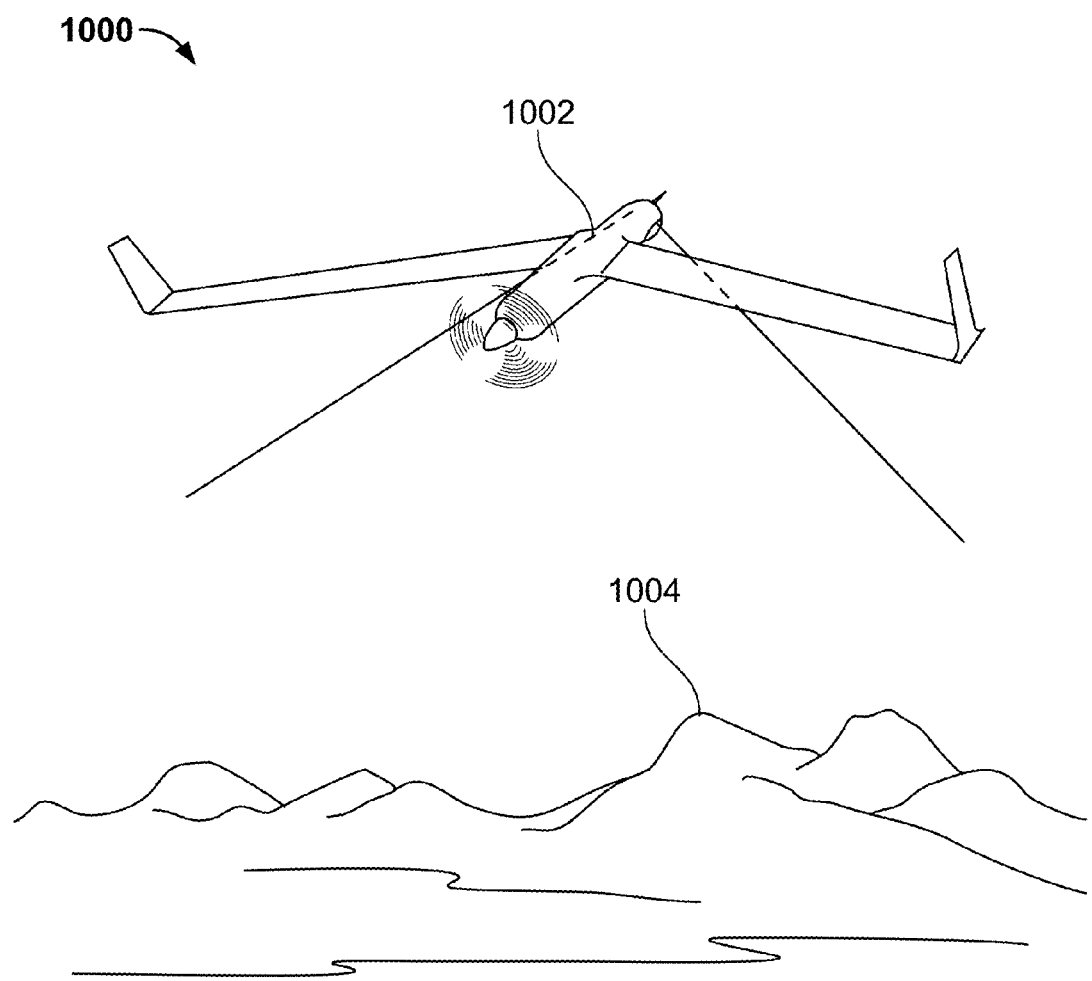
FIG. 10 shows an angled top-down view of an air vehicle according to one or more embodiments of the present disclosure.
Figure 11:
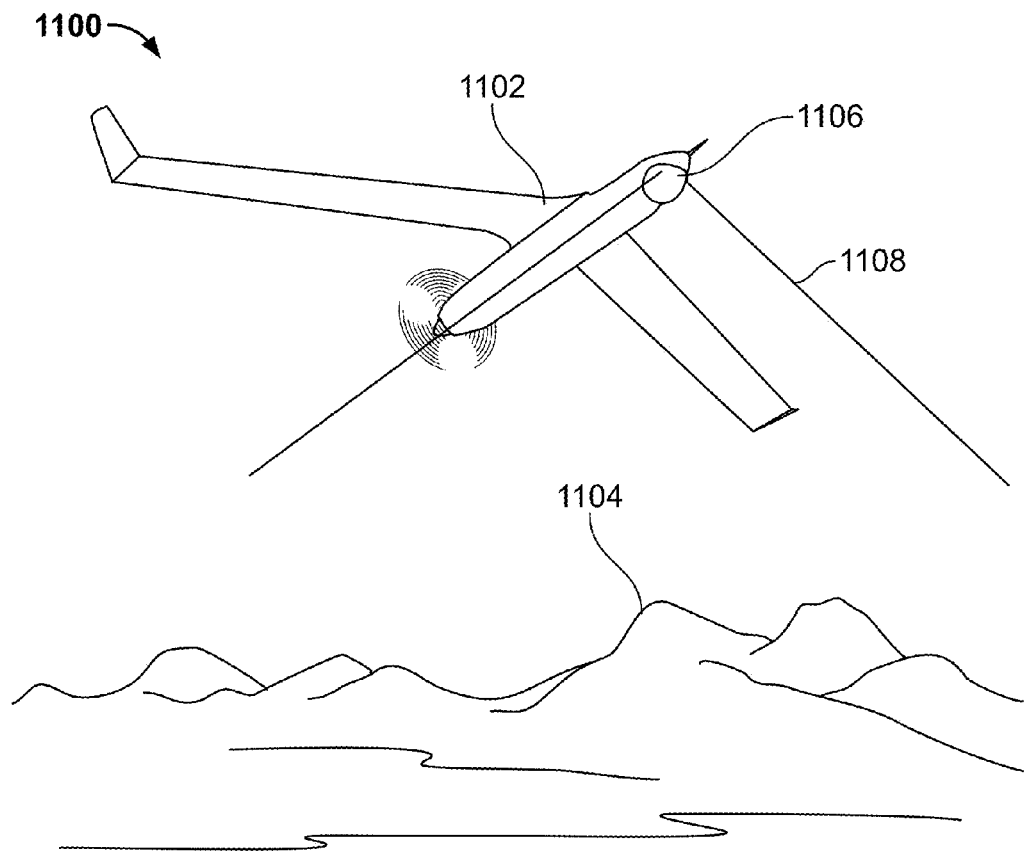
FIG. 11 shows an angled top-down view of an air vehicle according to one or more embodiments of the present disclosure.

For example, one or more embodiments of the present disclosure may be applicable to aerial surveillance and/or UAV's (Unmanned Aerial Vehicles). FIGS. 10 and 11 each show an example scene 1000, 1100 that include a UAV 1002, 1102 in flight over a landscape 1004, 1104. FIG. 10 shows an angled top-down view of UAV 1002 and FIG. 11 shows an angled bottom-up view of UAV 1102. Each UAV 1002, 1102 may include a data processing system that may execute part or all of the image registration techniques described herein. The details of an example data processing system will be described in further detail below. The data processing system may be mounted aboard the UAV, for example housed inside the UAV's body. Each UAV 1002, 1102 may further include a sensor or a camera that is capable of capturing an image of the landscape 1004, 1104 within the field of view of the sensor. For example, referring to FIG. 11, a sensor or camera may be located near the nose of the UAV, perhaps on the underside of the nose, housed within a transparent housing 1106. In this example, because the sensor is angled downward and located on the underside of the UAV, the sensor may have a wide field of view 1108 (FOV) that allows the sensor to capture large views of the landscape 1104 at once. In operation, the sensor on the UAV may take one or more target images of the landscape below the UAV. Then a data processing system within the UAV may perform image registration techniques that map details of the target image(s) to a pre-defined 3D reference model. Alternative, the UAV may transmit one or more target images to a remote data processing system that may perform the registration techniques.

Aerial vehicles or surveillance locations may require the registration/fusion of multi-modal 2D and 3D image data from multiple sensors and platforms into a single common operating scene. In addition to fusion of the sensor data, models or avatars for objects detected in a sensor's field of view may need to be projected into the correct locations on a 3D map or model, providing a dynamic real-time 3D fusion framework and common operating scene. This image fusion may need to work quickly and correctly over an extended geographic area using many different camera angles. One or more embodiments of the present disclosure may supply such solutions.

In other examples, one or more embodiments of the present disclosure may be used for computer vision, medical imaging, military automatic target recognition, remote sensing (cartography updating) and compiling and analyzing images and data from satellites. Image registration techniques can also be used to register a medical patient's data to an anatomical atlas, such as the Talairach atlas for neuroimaging. Image restoration techniques may also be used in astrophotography to align images taken of space where a computer uses control points and performs transformations on one image to make major features align with a second image. Image registration is also an essential part of panoramic image creation. Furthermore, there are many different techniques that can be implemented in real time and may run on embedded devices like cameras and camera-phones. One or more embodiments of the present disclosure may supply solutions that add flexibility to all of these applications.

Moreover, due to the vast applications to which image registration techniques can be applied, until now it has been difficult to develop a general method that is optimized for all uses. Instead, many applications have included additional techniques to cope with the application's unique situations. For example, medical image registration of data related to a single patient taken at different points in time often additionally involves elastic (also known asnonrigid) registration to cope with deformation of the subject (for example deformation due to breathing, anatomical changes, tumor growth, and so forth). Because of the flexibility that may be offered by one or more embodiments of the present disclosure, the present disclosure may provide a general image registration method that is optimized for many, if not all, uses.

In some implementations of the present disclosure the techniques, methods, routines and/or solutions described herein, including the example methods and routines illustrated in one or more flowcharts and block diagrams of the different depicted embodiments may be executed by a data processing system that is programmed such that the data processing system is adapted to perform and/or execute the methods, routines and solutions described herein. Each block or symbol in a block diagram or flowchart diagram referenced herein may represent a module, segment or portion of computer usable or readable program code which comprises one or more executable instructions for implementing, by one or more data processing systems, the specified function or functions. It should be understood that, in some embodiments, the function or functions illustrated in the blocks or symbols of a block diagram or flowchart may occur out of the order noted in the figures. For example in some cases two blocks or symbols shown in succession may be executed substantially concurrently or the blocks may sometimes be executed in the reverse order depending upon the functionality involved. Accordingly, the different embodiments of the present disclosure may take the form of a computer program product accessible from a computer usable or computer readable medium providing program code for use by or in connection with a computer or any device or system that executes instructions. Alternatively, the different embodiments of the present disclosure may take the form of a computer program stored on (and accessible from) a computer readable medium such as persistent storage or a hard drive.

Figure 12:
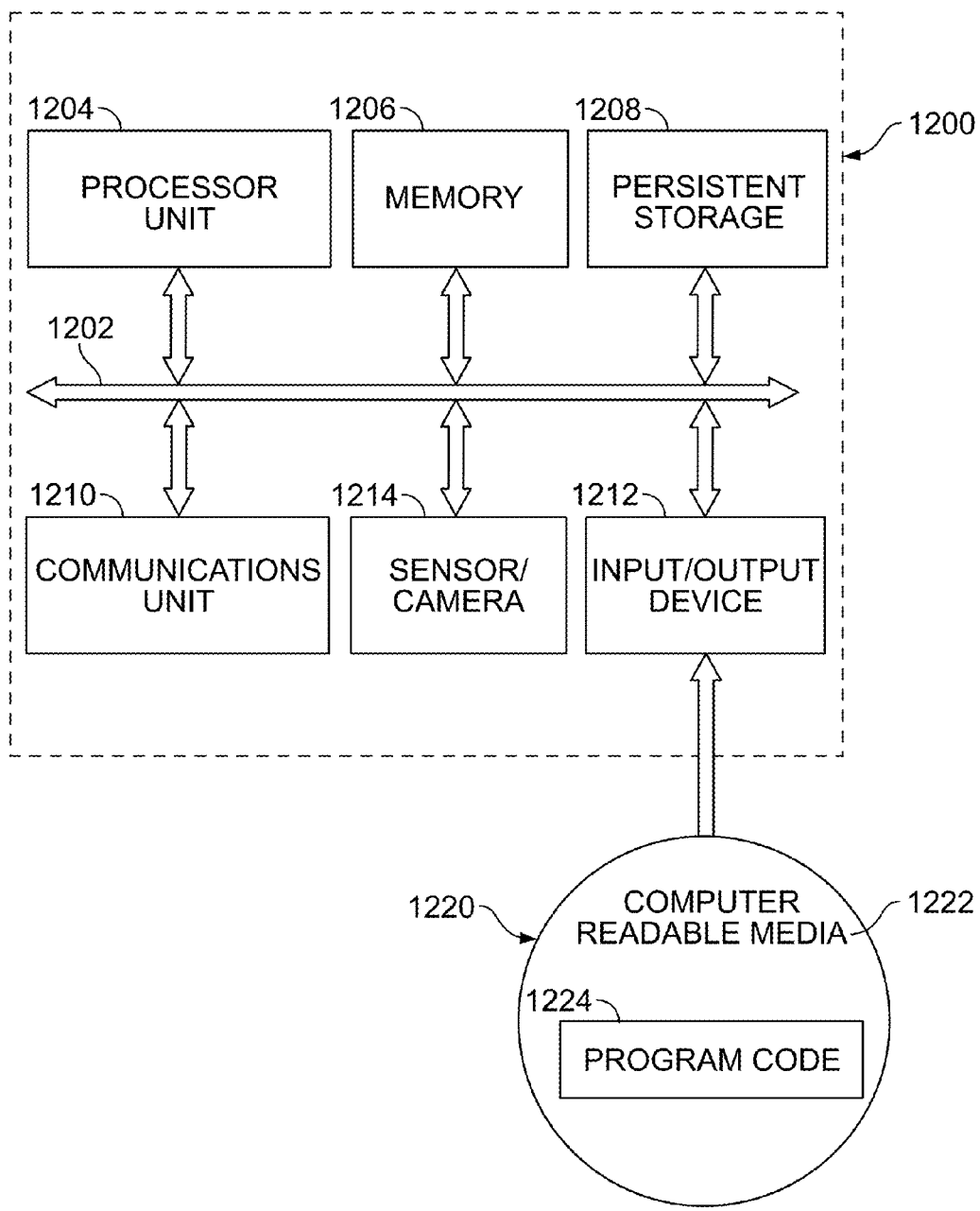
FIG. 12 shows an illustration of a block diagram of an example data processing system according to one or more embodiments of the present disclosure.

Turning now to FIG. 12, a block diagram of an example data processing system 1200 is depicted that may execute the methods, routines and solutions of the present disclosure. In this example, data processing system 1200 includes a communications fabric 1202 which provides communications between components such as a processor unit 1204, a memory 1206, a persistent storage 1208, a communications unit 1210, an input/output (I/O) device 1212 and a sensor or camera 1214. A bus system may be used to implement communications fabric 1202 and may be comprised of one or more buses such as a system bus or an input/output bus. The bus system may be implemented using any suitable type of architecture that provides for a transfer of data between different components or devices attached to the bus system.

Processor unit 1204 serves to execute instructions (for example, a software program or computer code) that may be loaded into memory 1206 from either persistent storage 408

(such as a hard drive) or from a computer program product 1220 (such as a CD or DVD). Processor unit 1204 may be a set of one or more processors or may be a multiprocessor core depending on the particular implementation. Further, processor unit 1204 may be implemented using one or more heterogeneous processor systems in which a main processor is present with secondary processors on a single chip. As another illustrative example, processor unit 1204 may be a symmetric multi-processor system containing multiple processors of the same type.

Memory 1206 in these examples may be, for example, a random access memory or any other suitable volatile or non-volatile storage device. Persistent storage 1208 may take various forms depending on the particular implementation. For example, persistent storage 1208 may contain one or more components or devices. For example, persistent storage 1208 may be a hard drive, a flash memory, a rewritable optical disk, a rewritable magnetic tape or some combination of the above. The media used by persistent storage 1208 also may be removable. For example a removable hard drive may be used.

Instructions for an operating system may be located on persistent storage 1208. In one specific embodiment, the operating system may be some version of a number of known operating systems. Instructions for applications and/or programs may also be located on persistent storage 1208. These instructions and/or programs may be loaded into memory 1206 for execution by processor unit 1204. For example, the processes of the different embodiments described in this disclosure may be performed by processor unit 1204 using computer implemented instructions which may be loaded into a memory such as memory 1206. These instructions are referred to as program code, computer usable program code or computer readable program code that may be read and executed by a processor in processor unit 1204. The program code in the different embodiments may be embodied on different physical or tangible computer readable media such as memory 1206, persistent storage 1208.

Instructions for applications and/or programs may also be included as part of a computer program product 1220 that is not permanently included in the data processing system 1200. The computer program product 1220 may include a form of computer readable media 1222 and program code 1224. For example, program code 1224 may be located in a functional form on computer readable media 1222 and may be loaded into or transferred to data processing system 1200 for execution by processor unit 1204. Program code 1224 and computer readable media 1222 may form a computer program product 1220. In one example, computer readable media 1222 may be in a tangible form such as, for example, an optical or magnetic disc that is inserted or placed into a drive or other device, for transfer onto a storage device such as a hard drive that is part of persistent storage 1208. The drive or other device may be connected to and in communication with other components of the data processing system 1200, for example, via the communications fabric 1202. In another tangible form, computer readable media may be a persistent storage such as a hard drive or a flash memory that is connected to data processing system 1200.

For the purposes of this disclosure a computer usable or computer readable medium may refer generally to any tangible apparatus that can contain, store, communicate, propagate or transport data (such as a software program) for use by or in connection with a system, for example one that executes instructions. The computer usable or computer readable medium can be for example without limitation an electronic magnetic optical electromagnetic infrared or semiconductor system or a propagation medium. Non-limiting examples of a computer readable medium include a semiconductor or solid state memory magnetic tape a removable computer diskette a random access memory (RAM) a read only memory (ROM) a rigid magnetic disk and an optical disk. Optical disks may include compact disk read only memory (CD ROM) compact disk read write (CD R/W) and DVD. Further, a computer usable or computer readable medium may contain or store a computer readable or usable program code such that when the computer readable or usable program code is executed on a computer the execution of this computer readable or usable program code causes the computer to execute specified routines, procedures, steps and the like. The tangible form of computer readable media is also referred to as computer recordable storage media.

Input/output (I/O) device 1212 allows for input and output of data with other devices that may be connected to data processing system 1200. For example, input/output device 1212 may be a CD or DVD drive that may read data stored on a computer readable medium (such as a CD or DVD), for example computer readable media 1222. Input/output devices can be coupled to the system either directly or through intervening I/O controllers. Program code 1224 may be transferred to data processing system 1200 from computer readable media 1222 through input/output device 1212.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown.

The program code 1224 may take the form of computer code that performs many of the computations and processes required by the image registration techniques described herein.

Figure 13:
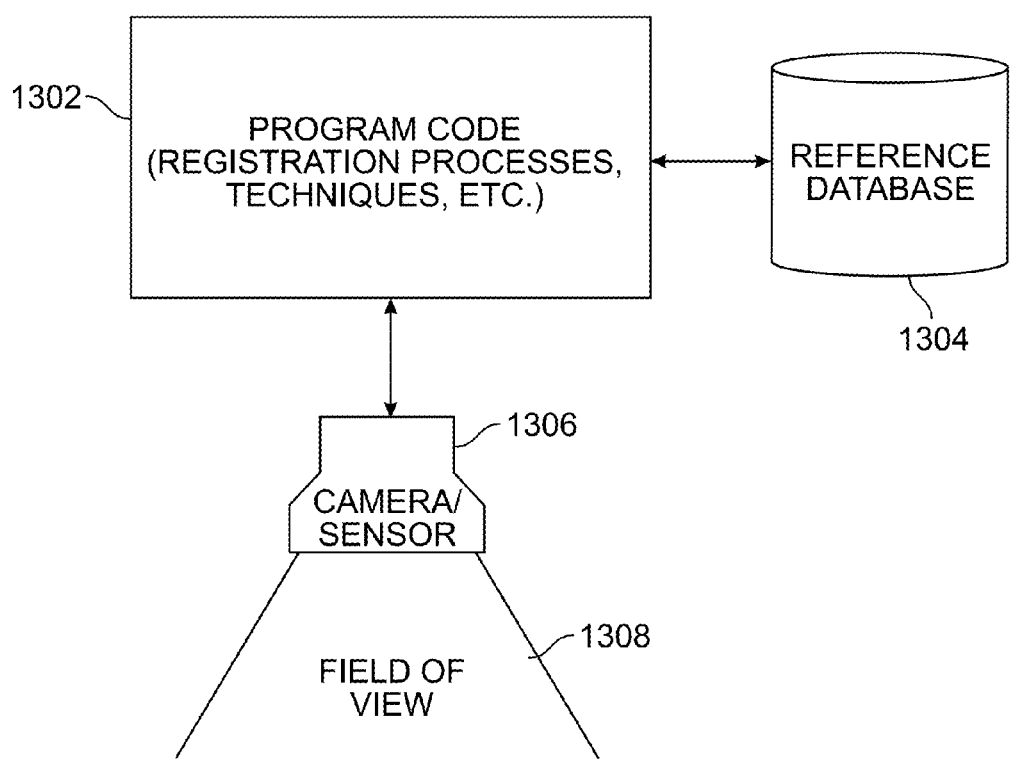
FIG. 13 shows an illustration of a block diagram showing example interactions between program code and other components according to one or more embodiments of the present disclosure.

FIG. 13 shows example program code 1302 which may include one or more of the image registration techniques described herein, include techniques described by one or more of the flow diagrams of this disclosure. Program code 1302 may be in communication with a reference database 1304, where the reference database 1304 contains reference data such as one or more reference models required by one or more of the solutions described herein. Reference database 1304 may be stored on persistent storage, for example, similar to persistent storage 1208, shown in FIG. 12. Alternatively, reference database 1304 may be stored on a storage device that is located remotely relative to the data processor that may execute program code 1302. Program code 1302 may also be in communication with a camera or sensor 1306, where the sensor may be capable of capturing one or more target images (for example, a scenes within the sensor's field of view 1308) to be used by one or more of the solutions described herein. Sensor 1306 may be coupled directly to a data processing system, like the sensor 1214 of FIG. 12 is coupled to the data processing system 1200, where the data processing system executes the image registration techniques (program code 1302). Alternatively, the system that executes the image registration techniques (program code 1302) may be located remotely relative to the sensor 1306, in which case target images captured by sensor 1306 may be transmitted to the remote system.

Referring again to FIG. 12, data processing system 1200 may include a communications unit 1210 that may provide for communications between data processing system 1200 and other data processing systems or devices. In these examples, communications unit 1210 may be a network interface card. Communications unit 1210 may provide communications through the use of either or both physical and wireless communications links unit allows for input and of data. The communications unit may include one or more devices used to transmit and receive data such as a modem or a network adapter. The communications link may be physical or wireless in the illustrative examples. In some embodiments of the present disclosure, if for example a reference database or a sensor/camera are installed in a location that is remote to the data processing system 1200, the communications unit 1210 may provide an interface so that data may be transmitted to and from these remote components. For example, a data processing system 1200 may receive data from a remote sensor/camera via the communications unit 1210, or the data processing system 1200 may receive data from a remote reference database via the communications unit 1210.

Figure 14:
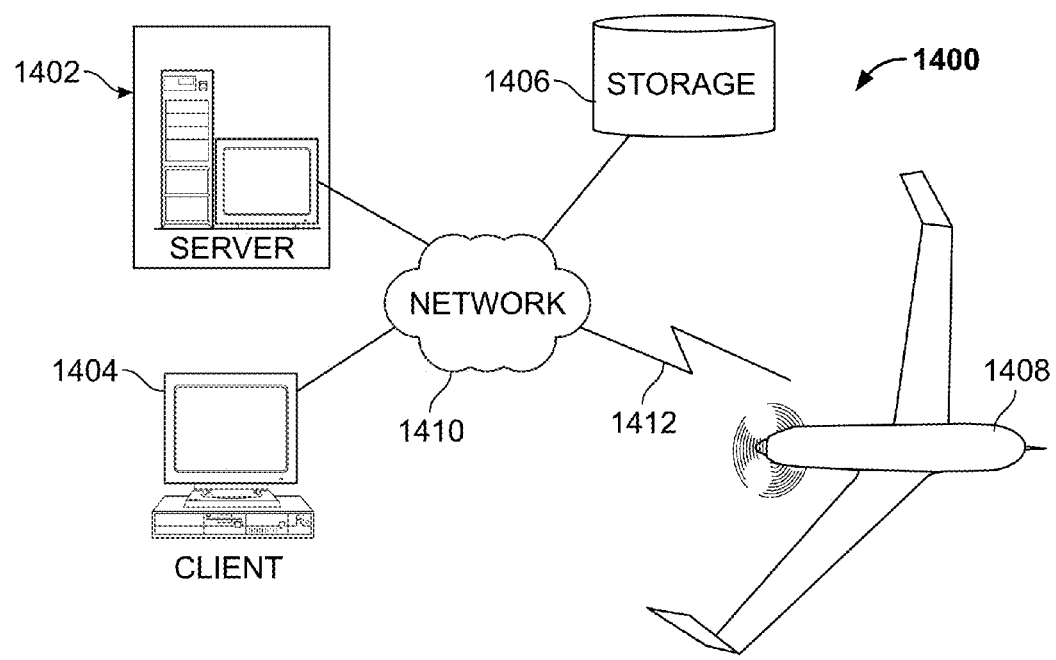
FIG. 14 shows an illustration of a diagram of an example system of network-connected data processing systems and components according to one or more embodiments of the present disclosure.

FIG. 14 shows a diagram of an example network system 1400 of network-connected data processing systems and components according to one or more embodiments of the present disclosure. Network system 1400 may include a network 1410 that connects, potentially, one or more client machines 1404, potentially, one or more server machines 1402, potentially, a stand-alone storage device 1406 and a data processing system that may be mounted aboard a vehicle 1408 (such as a UAV). The client machine(s) 1404 may be for example personal computers or end-user computers. Network 1410 is a medium used to provide communications links between various data processing systems (and perhaps other components), and network 1410 may include connections such as wired or wireless communication links, or perhaps fiber optic cables. The network 1410 may include internet connections and perhaps remote secured connections. In some examples, network 1410 represents a worldwide collection of networks and gateways that use the Transmission Control Protocol Internet Protocol (TCP IP) suite of protocols to communicate with one another. The network system 1400 also may be implemented as a number of similar or different types of networks such as, for example an intranet, a local area network (LAN) or a wide area network (WAN). Typically, each data processing system and component within the network system 1400 would include a communications unit, for example like the communications unit 410 of FIG. 12, thereby allowing the data processing system or component to interact with the network 1410 and, in turn, other network-connected data processing systems.

In one example, a data processing system may be mounted aboard a vehicle 1408 (such as a UAV), and the data processing system may include a communications unit that allows for wireless communication 1412 with the network 1410 and, in turn, other network-connected data processing systems. The data processing system mounted on the vehicle 1408 may be similar to the data processing system 1200 of FIG. 12. The data processing system mounted on the vehicle 1408 may perform part or all of the registration techniques described herein. For example, the data processing system may acquire reference data via the network 1410 (for example from a server machine 1402 or a network connected storage 1406), and then perform the remainder of the registration computation via the data processing system aboard the vehicle 1408. In another example, the data processing system may acquire target images via a sensor onboard the vehicle 1408 and then transmit the target image via the network 1410 to a network connected data processing system (for example included within a client machine 1404 or a server machine 1402), whereby the network connected data processing system performs the majority of the registration calculations.

FIG. 14 is intended as an example and not as an architectural limitation for different embodiments. It should be understood that network system 1400 may include additional (or fewer) server machines 1402, client machines 1404, storage 1406, vehicles 1408 and perhaps other data processing systems and/or devices not shown. Additionally, the vehicle 1408 may be some vehicle other than a UAV, for example another type of aircraft, automobile, watercraft or the like. Additionally, instead of vehicle 1408, or in addition, network system 1400 may include a sensor or camera (and optionally a data processing system) that is contained within a device, but is not a vehicle. For example, a camera system mounted on a pole, building, natural landmark, or even carried by a human.

The description of the different advantageous embodiments has been presented for purposes of illustration and description and is not intended to be exhaustive or limited to the embodiments in the form disclosed. Many modifications and variations will be apparent to those of ordinary skill in the art. Further different advantageous embodiments may provide different advantages as compared to other advantageous embodiments. The embodiment or embodiments selected are chosen and described in order to best explain the principles of the embodiments the practical application and to enable others of ordinary skill in the art to understand the disclosure for various embodiments with various modifications as are suited to the particular use contemplated.

The invention claimed is:

1. A method for image registration, the method comprising:
   establishing a three-dimensional reference model of a scene;
   acquiring a target image of the scene, the target image being captured with a sensor;
   determining the viewpoint of the sensor that captured the target image using one or more three-dimensional geoarcs,
      wherein the viewpoint of the sensor is determined relative to the three-dimensional reference model; and
   generating a composite three-dimensional representation of the scene by associating data from the target image with data from the three-dimensional reference model, wherein the viewpoint of the sensor is used to perform the association;
   wherein the step of determining the viewpoint of the sensor further comprises:
      identifying one or more feature pairs in the three-dimensional reference model;
      identifying one or more feature pairs in a target image;
      for each feature pair in the target image,
         associating the feature pair in the target image with one of the feature pairs in the three-dimensional reference model,
         estimating an angle associated with the feature pair in the target image,
         generating a three-dimensional geoarc surface associated with the three-dimensional reference model, wherein the geoarc surface represents relationships between the feature pair in the target image and the estimated angle; and
      identifying locations in three-dimensional space relative to three-dimensional reference model where two or more three-dimensional geoarc surfaces overlap.

2. The method for image registration of claim 1 wherein the step of generating a three-dimensional geoarc surface includes representing uncertainty in the estimated angle by varying the thickness of the geoarc surface.

3. The method for image registration of claim 2 wherein the generated geoarc surface may overlap a previously generated geoarc surface, creating a three-dimensional volume.

4. The method for image registration of claim 1 further comprising:
selecting as the determined viewpoint of the sensor a location where the most geoarc surfaces overlap.

5. The method for image registration of claim 1 further comprising:
for each feature pair in the target image,
refining the generated three-dimensional geoarc surface by ignoring or removing portions of the three-dimensional geoarc surface which relate to viewpoints that are incorrect based on checks with reference data.

6. The method for image registration of claim 1 further comprising:
validating the determined viewpoint of the sensor by referring to reference data to predict additional features that should be visible in the target image if the determined viewpoint of the sensor is correct.

7. The method for image registration of claim 1 wherein the step of generating a composite three-dimensional representation further comprises:
determining the location of the sensor and the angle of the sensor relative to the composite three-dimensional representation; and
determining the location of one or more objects visible in the target image relative to the composite three-dimensional representation by, for each object, adding a translational offset to the location of the sensor.

8. The method for image registration of claim 1 wherein the step of generating a composite three-dimensional representation of the scene includes projecting in real time one or more objects associated with the target image into the 3D composite scene.

9. The method for image registration of claim 1 wherein establishing a three-dimensional reference model comprises establishing a three-dimensional reference model using information from a geospatial intelligence system database.

10. The method for image registration of claim 1 wherein the features of the feature pairs identified in the three-dimensional reference model and in the target image are characterized such that they are invariant with the rotation and scale of the reference model and the target image.

11. The method for image registration of claim 1 wherein the step of determining the viewpoint of the sensor includes partitioning the three-dimensional reference model into a number of regions and determining a potential viewpoint of the sensor within one or more of the regions.

12. A method for image registration, the method comprising:
identifying one or more feature pairs in a three-dimensional reference model;
identifying one or more feature pairs in a target image;
for each feature pair in the target image,
associating the feature pair in the target image with one of the feature pairs in the three-dimensional reference model,
estimating an angle associated with the feature pair in the target image,
generating a three-dimensional geoarc surface associated with the three-dimensional reference model,
wherein the geoarc surface represents relationships between the feature pair in the target image and the estimated angle; and
identifying locations in three-dimensional space relative to three-dimensional reference model where two or more three-dimensional geoarc surfaces overlap.

13. The method for image registration of claim 12 further comprising varying the thickness of the geoarc surface to represent uncertainty in the estimated angle.

14. The method for image registration of claim 13 wherein the generated geoarc surface may overlap a previously generated geoarc surface, creating a three-dimensional volume.

15. An air vehicle comprising:
a sensor adapted to capture images;
a data processing system communicatively coupled to the sensor, the data processing system programmed to:
establish a three-dimensional reference model of a scene;
acquire a target image of the scene from the sensor;
determine the viewpoint of the sensor that captured the target image using one or more three-dimensional geoarcs,
wherein the viewpoint of the sensor is determined relative to the three-dimensional reference model; and
generate a composite three-dimensional representation of the scene by associating data from the target image with data from the three-dimensional reference model,
wherein the viewpoint of the sensor is used to perform the association;
wherein to determine the viewpoint of the sensor, said data processing system is further programmed to:
identify one or more feature pairs in the three-dimensional reference model;
identify one or more feature pairs in a target image;
for each feature pair in the target image,
associate the feature pair in the target image with one of the feature pairs in the three-dimensional reference model,
estimate an angle associated with the feature pair in the target image,
generate a three-dimensional geoarc surface associated with the three-dimensional reference model,
wherein the geoarc surface represents relationships between the feature pair in the target image and the estimated angle; and
identify locations in three-dimensional space relative to three-dimensional reference model where two or more three-dimensional geoarc surfaces overlap.

16. The air vehicle of claim 15 wherein to generate a composite three-dimensional representation of the scene, said data processing system is further programmed to project, in real time, one or more objects associated with the target image into the 3D composite scene.

17. The air vehicle of claim 15 wherein the sensor is located on the air vehicle such that landscapes and scenes may fall within the sensor's field of view.

18. The air vehicle of claim 15 wherein the data processing system includes a memory,
wherein the memory is operable to store reference data, including the three-dimensional reference model, and wherein the memory is operable to store images captured by the sensor.

* * * * *

UNITED STATES PATENT AND TRADEMARK OFFICE
CERTIFICATE OF CORRECTION

| | | |
|---|---|---|
| PATENT NO. | : 8,855,442 B2 | Page 1 of 1 |
| APPLICATION NO. | : 13/459643 | |
| DATED | : October 7, 2014 | |
| INVENTOR(S) | : Yuri Owechko | |

It is certified that error appears in the above-identified patent and that said Letters Patent is hereby corrected as shown below:

TITLE PAGE: ITEM 73 should read

-- The Boeing Company, Chicago, Il (US) --

Signed and Sealed this
Eighteenth Day of August, 2015

Michelle K. Lee
*Director of the United States Patent and Trademark Office*

UNITED STATES PATENT AND TRADEMARK OFFICE
CERTIFICATE OF CORRECTION

| | |
|---|---|
| PATENT NO. | : 8,855,442 B2 |
| APPLICATION NO. | : 13/459643 |
| DATED | : October 7, 2014 |
| INVENTOR(S) | : Yuri Owechko |

Page 1 of 1

It is certified that error appears in the above-identified patent and that said Letters Patent is hereby corrected as shown below:

TITLE PAGE:

ITEM 76 should be changed to ITEM 75

ITEM 73 should read

-- The Boeing Company, Chicago, Il (US) --

This certificate supersedes the Certificate of Correction issued August 18, 2015.

Signed and Sealed this
Tenth Day of November, 2015

Michelle K. Lee
*Director of the United States Patent and Trademark Office*